(12) United States Patent
Gregg

(10) Patent No.: US 6,570,885 B1
(45) Date of Patent: May 27, 2003

(54) SEGMENT-CONTROLLED PROCESS FOR CONTROLLING CASTOUTS FROM A COMMUNICATION CACHE IN A PORT IN ANY OF MULTIPLE NODES IN A COMMUNICATIONS NETWORK

(75) Inventor: Thomas Anthony Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,011

(22) Filed: Nov. 12, 1999

(51) Int. Cl.[7] .................. H04L 12/54; H04L 12/56; G06F 12/14; G06F 12/16
(52) U.S. Cl. .................. 370/428; 370/396; 370/412; 370/415; 370/379; 370/471; 711/117; 711/125; 711/126
(58) Field of Search .................. 370/412, 414, 370/415, 416, 392, 355, 379, 380, 381, 382, 389, 471; 711/117, 118, 119, 120, 121, 122, 123, 124, 125, 126

(56) References Cited

U.S. PATENT DOCUMENTS

| | | | | |
|---|---|---|---|---|
| 5,036,518 A | * | 7/1991 | Tseung | |
| 5,664,145 A | * | 9/1997 | Apperley et al. | 711/117 |
| 5,903,559 A | * | 5/1999 | Acharya et al. | 370/355 |
| 5,948,060 A | * | 9/1999 | Gregg et al. | 709/212 |
| 6,044,445 A | * | 3/2000 | Tsuda et al. | 711/163 |
| 6,243,778 B1 | * | 6/2001 | Fung | 710/113 |

* cited by examiner

Primary Examiner—Kwang Bin Yao
Assistant Examiner—Kamran Emdadi
(74) Attorney, Agent, or Firm—Floyd A. Gonzalez; Marc A. Ehrlich

(57) ABSTRACT

Defines and handles segments in messages to place pauses and interruptions within the communication of a message between transmitted segments of the message. A port cache of the destination node of each transmitted message obtains a message control block (MCB) which is used to control the reception of inbound segments within each message sent or received by the node. Each MCB stays in the cache only while its message is being communicated to the port and may be castout between segments in its message when there is no empty cache entry to receive a MCB for a current message being communicated but not having its MCB in the cache. Different types of dynamic priorities are written in status fields in each non-empty cache entry to enable a current cache entry to be castout when it is most likely to have the longest wait for being needed next in the cache for a segment communication to its message, which reduces cache castout thrashing to increase the average reception speed for communicating messages in the network. If a common link switch is used in a network to connect links to all nodes, the segment structures in each message is musts be preserved when packets of each message are passed through the switch to a destination node which uses the castout controlled communication cache taught herein.

14 Claims, 12 Drawing Sheets

SEGMENT-CONTROLLED PROCESS FOR CONTROLLING CASTOUTS FROM A COMMUNICATION CACHE IN A PORT IN ANY OF MULTIPLE NODES IN A COMMUNICATIONS NETWORK

INCORPORATION BY REFERENCE

Incorporated by reference herein is the entire specification, including all text disclosure and all drawings, of application Ser. No. 09/439,012 filed on the same day as the present application and entitled "Segment-Controlled Process in a Link Switch Connected Between Nodes in a Multiple Node Network for Maintaining Burst Characteristics of Segments of Messages" by the inventor of the present application.

FIELD OF THE INVENTION

This invention generally deals with increasing the efficiency of message communications occurring at high volume and high speed among nodes in a network, in which the nodes may be central electronic computer complexes (CECs). The invention segments the transmission of packets in messages, wherein the segments are transmitted as high speed bursts of digital packets on a link in a network. This invention can significantly reduce cache castout thrashing in port packet control caches. In networks containing a common link switch to enable single port per node operation, this invention can increase overall network communication speed by maintaining transmitted segments within a network link switch, which is lost in conventional network link switches due to their failure to maintain segment contiguity when forwarding switch received packets to destination nodes.

BACKGROUND OF THE INVENTION

Communication networks contain N number of nodes in which each node may be a computer system, often called a Central Electronic Complex (CEC). Messages are communicated on links between the nodes of the network, and any node in the network may both send and receive messages. A node may be considered a message sender when it generates and sends a message, generally starting with a command. A node may be considered a message receiver if it receives the message. The command part of a message is followed by a response part of the message for informing the message sender of the status of the message received at the message receiver. A data part of the message is optional, and the data part may be included between the command part and the response part. The data part may be read data or write data, which are transmitted in either direction between the message sender and message receiver.

Each message is transmitted as a sequence of packets on one or more links connected between the message sender and message receiver in the network. Each packet header contains a source node ID and a destination node ID. Generally, each message starts with one or more command packets, which travel on the links in the direction from the message sender (generating the message) to the message receiver (receiving the message). After the command part of the message is transmitted, it is followed with any optionally data part of the message as a sequence of one or more data packets, which may travel in either direction on the network links according to whether "read" data or "write" data is indicated in the command part of the message. "Write data" travels from the message sender (commanding node) to the message receiver (commanded node). "Read data" travels in the opposite direction from the message receiver to the message sender. The message ends when its response part is sent by the message receiver to the message sender. The response part of the message follows any optional data part of the message, but the response part follows the command part if the message has no data part. Thus, the response part is transmitted on the links in the opposite direction from the command part.

A link switch may or may not be used in a network to connect the nodes in a network. A link switch may contain a plurality of switch receivers and switch transmitters, which may be respectively connected to bi-directional communication links to/from the nodes in the network, such as when a respective switch receiver and switch transmitter pair are connected to the link to one of the nodes in the network. Each of the receiver/transmitter pairs may be permanently assigned to a link connected node, the receiver receiving packets from the node when the node is acting as a source node and the transmitter sending packets to the node when the node is acting as a destination node. Each node has a unique identifier (ID) in the network, and each packet has a header containing the source node ID (source ID) and destination node ID (destination ID) of its message.

In a network switch, each of a plurality of switch receivers may be concurrently receiving packets from different source nodes, and each of the switch transmitters may be concurrently sending packets to different destination nodes. Thus, each receiver then always receives packets from same source node (to which it is connected), so that all packets received by each receiver have the same source ID, but may have different destination node IDs.

Further, each transmitter in the switch searches the headers of newly received packets at all of the switch receivers looking for a packet header having a destination ID matching the destination ID assigned to the respective transmitter. Then the packet is forwarded from the receiver to the transmitter having the destination ID in a received packet, and the transmitter sends the packet from the switch to the identified destination node.

During a receiver search, a transmitter may find multiple concurrently received packets at different receivers matching the transmitter's assigned destination ID, in which all such concurrently received packets have different source IDs, but all have the same destination ID which identifies the node connected to the transmitter. The transmitter may use a packet priority control to determine which of these concurrently received packets from different nodes should be selected next and sent to the transmitter's assigned destination node. Generally in the prior art, the switch priority control uses a round-robin selection among the receivers having concurrently received packets, so that the concurrent received packets are sequentially sent by the transmitter to its connected destination node, which at the destination node interleaves this sequence of link-communicated packets into different messages from different source nodes.

When sequences of packets are provided to a link, they comprise a burst of signals. If these packets are received by a network link switch, the speed of the packets in a given message may be slowed by the priority controls in the internal operations in prior art switches, because of the internal priority schemes used in the switches. This signal slow-down may be caused by a "fairness" priority protocol often used in link switches to select among concurrently received packets for transmission to the packet's indicated destination node. Generally, the prior art "fairness" priority selects for next transmission to an assigned destination node, either: the oldest waiting packet currently received by the switch, or the it may poll the receivers in the switch in a predetermined order (such as "round-robin") and select the first receiver found to have a waiting packet.

These prior types of "fairness" prioritization's schemes in a link switch tend to lose the transmission continuity of fast transmitted bursts of packets. A sequence of packets may be considered a burst when they are transmitted very fast on a link without any significant pause occurring between the packets in a burst. A loss in packet transmission continuity within a burst (such as due to packet interleaving by switch prioritization) may result in a slow-down in the ultimate speed of packet communication seen by the destination nodes. This slow-down therefore may be caused by the prior art "fairness" prioritization selection process in the prior art when it selects for next transmission by a transmitter the longest waiting packet in another message to the same destination node, or selects the next transmitted packet by a round-robin selection among the receivers.

Hence, while the prior art "fairness" prioritization schemes may appear to be the desirable thing to do, they have the unobvious effect of interrupting the bursts of packets being transmitted on the links, and the interruptions may occur anywhere during the packet bursts. This is because prior art link switches do not detect the burst characteristics among sequences of received packets, which would violate their "fairness" prioritization schemes for selecting a longest waiting packet in another message to the same destination node, or a packet at a next receiver scanned in a round-robin manner.

In each message transmitted on a link, there are various types of pauses and interruptions occurring between some of the packets transmitted within the message, such as the interruption between the end of the command part of each message and following read data part sent on the link in the opposite direction from the command part. Further, a controlled interruption in each message occurs at the required response part of the message, when it follows either the command part or a write data part which are transmitted in the opposite transmission direction between the message sender and message receiver. These transmitted bursts of packets are called "segments" in this specification.

The parts of each message of concern to this invention are the parts seen and stored by the destination node in a memory of the destination node, and it may use link transmission protocols which involve link response signals at the end of each packet to confirm successful reception from the link. These link controls are not the part of any message with which this invention is concerned, because such signal are thrown away as soon as their purpose is met of confirming successful link transmissions of each packet. If such link protocol signals result in slowing down a transmission, they may have the effect of interrupting a planned burst of packets, which may effectively divide a planned burst into two or more unplanned "segments" in a message being handled in a network switch designed according to this invention.

Thus, the subject invention utilizes the packet prioritization selection characteristics in a network link switch containing the invention described and claimed in patent application Ser. No. 09/439,012, which requires the switch to recognize both planned and unplanned "segments" occurring in the transmission of packets in each message, and does not use the prior art "fairness" priority controls previously used by network-link switches to control the switch's re-transmission of packets.

Independent of whether or not a network link switch is being used in a network, this invention provides in each nodal port in a network special castout controls for use in a control cache provided in each port of the network. The control cache is provided at each node of the network, whether the node has a single port or multiple ports, but these castout controls are particularly effective with ports having very high traffic such as is more likely to be found with nodes having single ports connected by a network link switch. These castout controls are used with inbound segments of packets in messages being sent and received by the port.

The control caches of this invention are dynamic caches, in that they only store valid contents for messages in transmission. That is, whenever a message transmission is completed, all cache contents for that message are castout to the nodal memory, and the cache space occupied by these contents is made available for use in the transmission of another message. Each cache entry is usable by controls for a different message being transmitted. The number of cache entries in any cache is limited in number, and when all cache entries are full, the contents of an entry must be selected for castout to locations in the destination node's memory.

The control cache used by this invention should not be confused with conventional caches which store data or instructions. The control cache of this invention only stores control information which is used in controlling the flow of message data between a link buffer and a nodal memory. That is, the message data never gets into the cache, wherein the control cache only stores control information, such as a list of nodal memory addresses for storing payloads of segments of transmitted packets moved to or from a link buffer in the local port and a nodal memory which is not in a port.

Bursts of digital signal are transmitted in sequences of packets between a source node and a destination node, and these sequences only pass through any network switch when the network has a switch. The sequence of packets comprising each segment is setup at the segment's source port, which is in the source node's memory prior to transmission. After packet setup, the segment of packets is transmitted at the maximum link speed as a sequence of digit signals from the source node to the destination node. Each burst may involve a few packets or may involve a large number of packets, and a burst must end when a segment boundary is reached within the message, such as the end of the command part of the message or the end of the data part or the response part of the message. A segment may end when the source node reaches a transmission point in a sequence of packets at which the transmitting node port must momentarily stop transmitting the sequence to perform a housekeeping operation before it can continue the transmission. For example, a momentary pause may be caused by line fetches for memory accesses, or interruptions may be caused by a page fault for a disk access to obtain data to maintain a data packet transfer on the link. Also, source computer task switching may occur during transmission of a sequence of data packets and cause a temporary interruption. Thus, any of these pauses and interruptions within a message being transmitted on a link ends a segment (a high-speed burst being transmitted). If the packets of these segments go through a network switch, the switch needs to have special controls to recognize and maintain the segment "bursts".

When a network switch is used to allow the use of single port nodes, the great advantage of easy scalability of the network size is obtained. The scalability advantage in the use of a network link switch may be shown by comparing a switched network containing N number of nodes with an unswitched network containing an equal number of nodes. It is known that N number of nodes in a network may be connected via links in any of several different ways. One way is to use non-shared bi-directional links, in which the non-shared links respectively connect different pairs of the nodes in a switchless network. Simultaneous communication of messages is enabled by the non-shared links between the different pairs of nodes in the network on the different links. This switchless network has the great disadvantage of lacking ease of scalability in the size of the network if it is later decided that one or more nodes should be added in the network to its N number of nodes.

This scalability difference may be shown as follows: A switchless network requires N(N–1)/2 number of non-shared links in a network having N number of nodes. Then, each node in the switchless network is required to have N–1 ports that respectively connect to the unshared links in the network. The significant disadvantage in its network scalablity is primarily caused by the (N–1) number of ports required in each node of the network, since the number of ports must be changed in every previously existing node in the network when the number N of nodes is increased in the network. This can only be done with great difficulty and expense.

The switched network provides a solution to the scalability problem when it connects all nodes through a single link switch, because then each node only need use a single port to send/receive all of its messages to/from all other nodes in the network through the link switch. However, the single transmission port of each node in a switched network must operate at a much faster transmission speed than each port in a switchless network when communicating the same number of messages in a network, because each of the single ports is required to handle, on average, N times the number of messages per port in a switchless network. This increased message speed and traffic for each port in the switched network requires each port to operate at a communication rate that is N times faster than each port in a switchless network. Thus, the faster link transfer rates required in switched networks may strain the ability of the single nodal ports to handle the greatly increased message transmission rates and added volume of messages, which indicates the added efficiency provided by this invention is particularly useful in the single ported nodes of switched networks.

FIG. 1 shows an example of a switchless network having four nodes (i.e. four computer systems) 101, 102, 103, 104 which are fully interconnected by links 111, 112, 113, 114, 115, 116 without using any link switch. Each port connects its node to only a single other node in the network, so that each node requires multiple ports to connect multiple other nodes in a network. Full connectivity to all nodes in the network of FIG. 1 is obtained through three ports at each node. For example, node 1 has the three ports 121, 122, 123, and a corresponding three ports are found likewise in each of the other three nodes 2, 3 and 4 in the network. In the switchless network configuration of FIG. 1, each port can only communicate to one other node.

N nodes are found in a network of the type shown in FIG. 1, and the N nodes require N*(N–1)/2 links, in which each node requires N–1 ports connected to N–1 links. Thus, the 6 links in FIG. 1 connect the 4 nodes by each node having 3 ports connected to 3 of the 6 links. As the number of nodes, N, increases in a network, the number of links grows as the square of N. For example, a network of 16 nodes would require 120 links, and each node would require 15 ports. The switch-free network arrangement in FIG. 1 clearly becomes more difficult to implement as the N number of nodes in the network increases, due to an N squared increase in number of links required, and a linear increase in the required number of ports per node.

For these reasons, this invention prefers the link-switched environment in a network of the type shown in FIG. 2 to overcome scaleability problem encountered by the switchless network of the type shown in FIG. 1. FIG. 2 has a communication link switch 201 connected between four nodes 211, 212, 213, 214, each node being a computer system, which may be the computer type provided for each node in FIG. 1, and the computer system of each node may have a single shared memory and any number of central processors.

Hence in FIG. 2, only one port is required per node regardless of the number N of nodes in the network. Then the total number of ports and links in the network may be equal to the number N of nodes in the network. Thus, N number of links may connect N number of nodes in the switched network of FIG. 2.

Also, the port control provided for each single port per node in FIG. 2 is significantly different from the port control provided for each of the multiple ports per node in the network configuration of FIG. 1. Each of the four links 221, 222, 223 224 shown in FIG. 2 are connected to the same link switch 201.

Accordingly, the number of links in a switched network of FIG. 2 increases linearly with an increase in the number N of nodes in the network. Also, N is the total number of links in the network. Hence in FIG. 2, each node requires only one port 231, regardless of the total number N of nodes and the total number N of links in the network. In the detailed embodiment described herein, the link switch contains N number of receivers and N number of transmitters, and each node in the network is uniquely connected to one receiver and one transmitter in the switch.

While the switched network of FIG. 2 reduces the number of hardware links and ports to one per node, the complexity of the network is therefore increased in several ways. First, a hardware link switch 231 contains novel internal packet-priority-selection controls. Second, novel castout controls are provided for each single port per node to enable the port to recognize segment characteristics occurring in its communications with all other N–1 nodes in the network (e.g. the three other nodes in FIG. 2). A consequence in switched networks of the type in FIG. 2 is that the one port per node is required to handle an average of N–1 amount of message state information, when compared to the amount of message traffic handled by each node in the switchless network shown in FIG. 1. Nevertheless, a significant cost improvement is obtained by the switched network in FIG. 2 over the network in FIG. 1 for networks having a large number of nodes, because hardware ports and their installation involved much more expense than the added speed and storage required in the ports of the network in FIG. 2.

For all of these reasons, this invention prefers the network of FIG. 2, primarily due to the comparative reduction in the required number of ports per node as the number of nodes is increased in a network. The number of ports in the network of FIG. 2 increases linearly as the number of nodes increases, compared to nonlinear increase (by the square of N) in the switchless network of FIG. 1 having N*(N–1) ports. Then, the hardware cost savings of the network in FIG. 2 varies with: {N*(N–1) ports–N port–link switch}, and these savings are significant for networks having a large number N of nodes.

SUMMARY OF THE INVENTION

This invention defines and handles segments in its transmitted messages to place the occurrence of pauses and interruptions occurring during any message between the defined segments in the message. This allows each segment to be transmitted as a high speed signal burst. Each segment is handled as a transmission unit at the source node, at the destination node, and in any network switch. The segments are detected in the network switch as its packets are received, and the switch can interleave the detected segments of concurrent messages having the same destination node while maintaining forwarding speed for the packets in each message. Unexpected pauses and interruptions exceeding a time-out period occurring within any transmitted segment are handled efficiently in the switch. At the destination node of each transmitted packet, this invention enables a port to detect the segments (i.e. in commands, data, and responses in each received message), and a port cache controls the assembly of the received messages while reducing cache castout thrashing to enable maximum reception speed for the messages.

The node transmitting packets is the "source node," and the node receiving packets is the "destination node." The source node and destination node IDs are contained in each packet header. The "message sender" is the node that transmits the command packets and optional "write" data packets. The "message receiver" is the node that transmits any optional data packets followed by the response packets.

It is an object of this invention is reduce castout thrashing of messages controlled in nodal caches for retaining the messages in a nodal main memory. The castout reduction enables an increase in the rate and number of messages which may be handled at each nodal port. Castout thrashing occurs when incomplete messages are castout from the portal cache to make space for a new message when the castout message will later have to be re-fetched into the caches to receive more packets for its completion.

It is another object of this invention to increase the speed of message communications in a network of nodes using portal caches to assemble link-communicated messages by using novel priority control processes in each nodal port using a port cache for controlling the assembly of received messages. If a network link switch is used in the network, the switch must maintain the segments as they pass through the switch in the manner taught in concurrently-filed patent application Ser. No. 09/439,012. In that specification, a new prioritization method is used in network switches that prioritizes internal switch selection of switch received packets for transmission to the destination nodes among packets currently received by the network switch. This network switch prioritization enables the switch to avoid a reduction in the transfer rate of packets through the switch as occurs in prior switches using prior prioritization methods. The switch prioritization sends the newest (i.e. most recently received) packet to the switch transmitter connected to the destination node identified in the packet, regardless of whether the packet is selected out-of-order relative to other prioritization protocols such as FIFO, LIFO, round-robin, "fairness", etc. Its "newness protocol" enables messages communicated on links in the network to be assembled in portal caches at a reduced castout rate to improve the message handling efficiency in the network. A reduced castout rate reduces "Castout thrashing" in the number of cache fetch operations used for messages being assembled in the port. "Castout thrashing" is caused by unnecessary castouts causing associated re-fetch operations.

The packets are transmitted in segments on links from a source node to a link-switched destination node. Each segment is transmitted by the source node to a connected link as a burst of digital signals.

Each transmitted message is initiated by a command provided to the connected link by the message sender. The command part of a message is a sequence of packets comprising the first segment of each message. Each segment is a burst of signals comprising one or more packets sent on the link to a network switch. The last packet in each segment is indicated by either: a last-packet indicator in each packet of the segment, or by a last-packet count in the first packet of each segment.

Each packet in the same segment has the same source node indication and the same destination node indication. Each transmitter in the switch stores the source identifier of its last transmitted packet, and the stored source identifier is reset to a null value when the last packet of the current segment is transmitted.

When any packet is received by any network switch, the switch associates the packet with the switch transmitter assigned to the destination node identified in the packet. Each received packet is transferred by internal priority controls from its receiver to its assigned transmitter. Each of plural transmitters in a network switch may be operating independently of each other to transmit packets to connected destination nodes. Each switch transmitters enforces the special internal switch priorities to maintain segments passing through the switch, since otherwise the priority operations within the switch may unknowingly breakup the received segmemts into smaller segments resulting in a slowing of the transmission of a message.

This invention provides a new castout replacement process for use in communication caches of the nodes of a switched network for assembling received (inbound) messages. The new castout replacement protocol selects for castout the newest (i.e. most recently serviced) cache entry in the nodal communication cache when it is most likely to have the longest wait before it again needs to be in the cache for its next servicing when it will next receive a data segment or a response segment. The selection for castout of the newest (i.e. most recently serviced) cache entry is enabled by the new priorities provided in the network switch which focus the resources of the switch on the most recent (newest) message segment having a transmitted packet.

The sequence of packets comprising each transmitted message (commands, data, and responses) is segmented by the source node. The source node attempts to send the packets of each message as fast as it can by providing the least possible delay between its transmitted packets. However, significant delay cannot be avoided between some packets in a message. Whenever a significant delay is encountered, the source node ends the current segment to allow other messages to use resources which would otherwise not be available during that delay time. Delays occur in each message at its source node, for example, between the command segment and any first write data segment, between data segments when a new memory access needs to be made for a new data line, and between the last read or write data segment and the response segment. Thus, the data of a message may be divided into segments to allow immediate transmission of small chunks of data (typically a memory line). If all the data in a message had to be transmitted contiguously, all of the data of the segment would need to be fetched before any of it could be transmitted, and this would add latency delays in the operation of the source node's operation.

The castout operation is to a Message Control Block (MCB) in a "MCB Table" in the main memory of the respective node. The MCB Table contains all MCBs for all messages sent and received by the respective node. The MCBs may be located in the MCB Table in any predetermined manner, such as by indexing the MCB slots therein according to the "source ID, message ID" found in each packet of each message received and sent by the node. The communication cache is located in the port of the node in a local memory of the port, which need not be part of the main memory of the respective node (i.e. a computer system).

This invention is preferably used in an environment that allows for the automatic expansion of the number of nodes in the network in which all network communication through a network switch uses only a single port in each node of the network. Network expansion only requires adjustment in the size of the MCB Table in the main memory of each node in the network. Node expansion in the network does not affect the hardware in any port used by the respective nodes in the network and need not affect the cache structure in each node, regardless of the number of nodes in the network. Expanding the number of nodes in a network requires that the MCB Table have a slot for each node in the network, and increasing the number of nodes in the network then requires another slot be added to the MCB Table for each added node.

Each message control block contains a plurality of different segment type identifiers in a plurality of pointers (addresses) which locate areas in the computer memory for storing the commands, data, and responses in the payloads of the packets of a message received or sent by the port of each node.

This MCB structure is copied into any allocated empty MCB Entry in the associated port cache when the MCB is activated by the transmission of a message over the network to or from the respective node. The associated port cache may have a directory of tags, in which the tags are respectively associated with MCB Entries in the cache. Each tag includes a field for a source ID, a message ID, and an empty bit to indicate if an MCB Entry is empty or contains a valid MCB.

When any packet of an inbound message is being forwarded from the switch, any non-empty MCB Entry assigned to that message in the cache is found by comparing the source ID and message ID in each packet of the message with the non-empty tags, and a compare equal indicates that the tag having an associated MCB Entry in the cache is found. If no compare equal tag is found, a cache miss occurs, and any empty MCB Entry is assigned to the tag and the source ID and message ID in each packet of the message is written into the tag and its empty bit is set to the non-empty state. However, if no empty MCB Entry is found in the cache, the newest MCB Entry is castout to the MCB Table, its associated Tag is set to the empty tag state, and it this tag and its associated MCB Entry is reassigned to the packet being currently forwarded.

The link-switched network arrangement enables each node's single port to be easily adapted to expansion of the number of nodes in the network, which would not be possible in a non-switched network having N−1 number of ports per node in the network, since N is increased which would required more ports for every node in the network (a burdensome hardware increase).

Accordingly, this invention uses contiguous packet transmission within each segment of a message to control its segmented message communications. The replacement operations in the destination node's cache are also driven by the message segmentation to provide a more efficient method of handling the communication of messages between nodes in a network than the previously allowed switching between "packet transmissions". An improvement in communication efficiency results in the use of this invention.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

DESCRIPTION OF THE DETAILED EMBODIMENT

Figure 1:
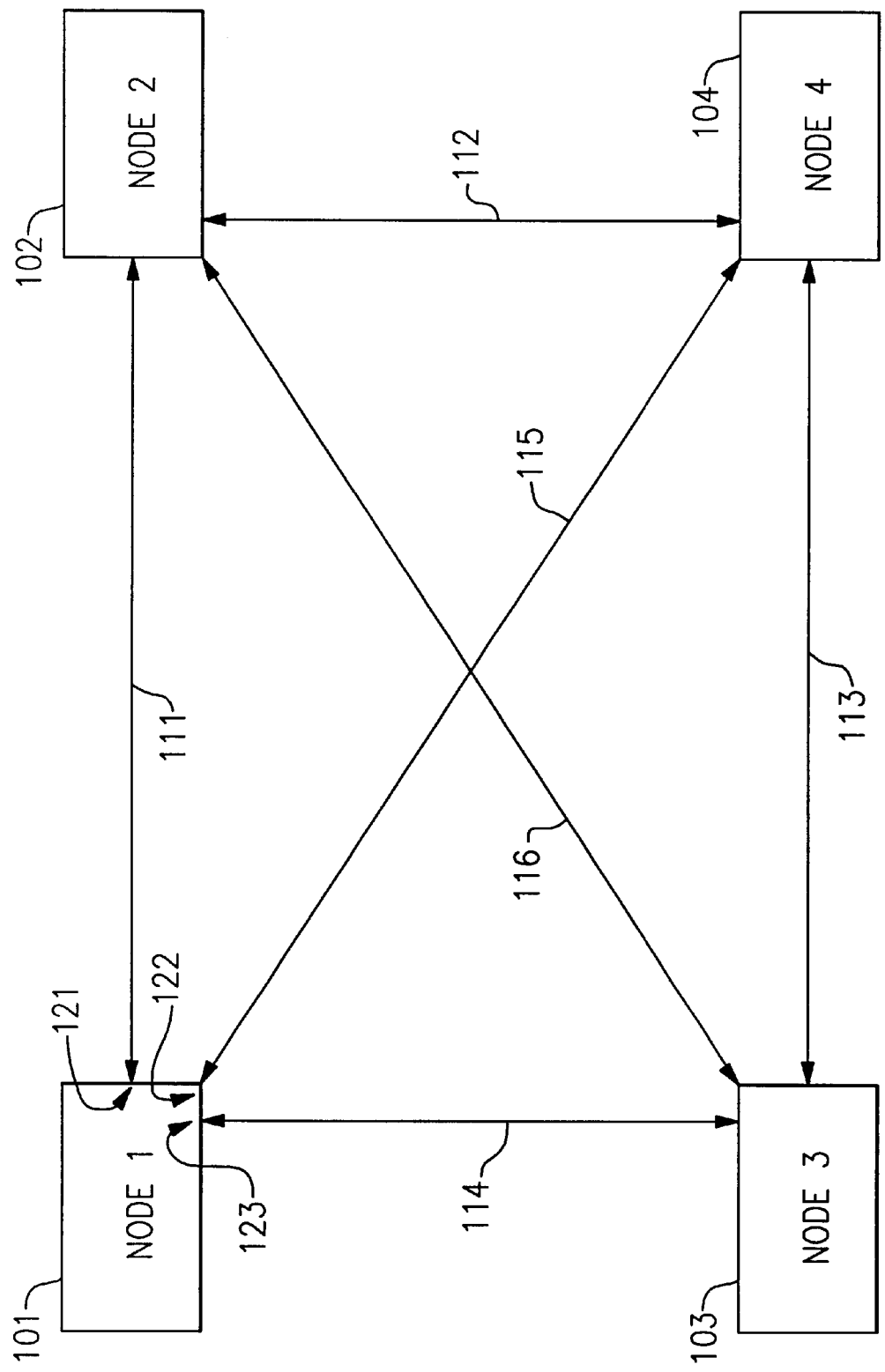
FIG. 1 shows a network structure having a plurality of nodes directly connected by unshared bi-directional communication links, each link connecting a different pair of nodes in the network.
Figure 2:
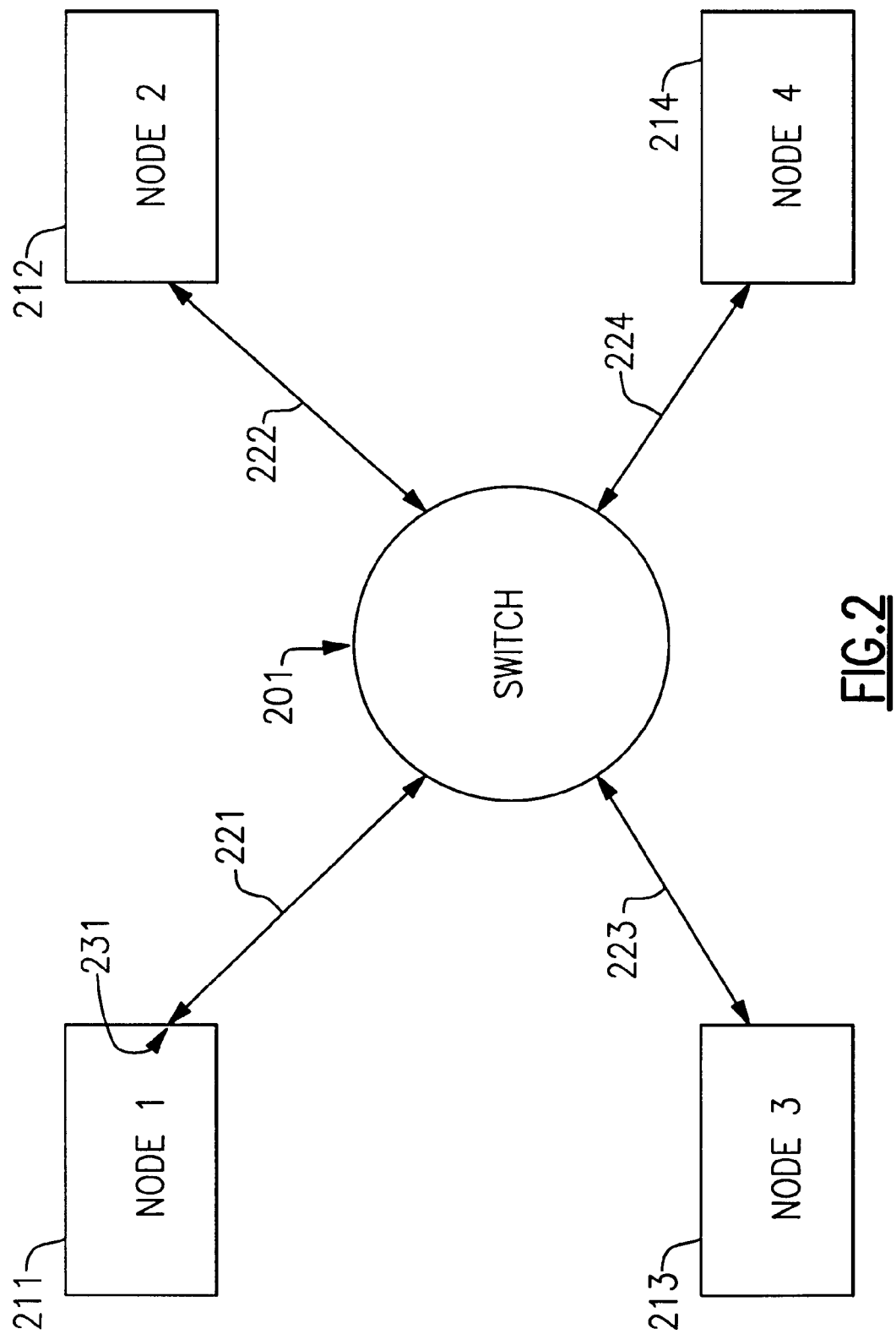
FIG. 2 shows a switched network structure having a network switch directly connecting bi-directional communication links to all nodes in the network.

Each node in the described networks has a computer system containing a single main memory, which may be shared by one or more central processors in the node. There is no limit to the number of central processors which may be found in any node, other than resource limitations needed to support the processors in the respective node.

Any node may be both a message sender sending a message command and a message receiver receiving another message command. Thus, a node acting as a message sender may communicate a message command on links connected to a node acting as a message receiver. Each message is transmitted as a sequence of packets sent in groups herein called segments, wherein each segment is comprised of one or more packets sent in a burst on a link. A significant time delay is normally expected between transmitted segments of a message (i.e. significantly longer than the average time between adjacently transmitted packets within a segment). Each message is transmitted with a command segment, one or more optional data segments which either read or write data, and a response segment.

This invention primarily differs from the prior art in the way it handles segments in control caches in the ports of the nodes. It is to be understood the port control cache of this invention may operate with or without having a link switch in the network.

A message sender generates and transmits the command segment in each message and indicates the packet ending each segment in the message, which in the preferred embodiment is done by placing a last-packet indicator in each packet which may be set to indicate whether or not the packet is the last packet of a segment. The first packet of each segment is either the first packet of a message or the packet following a last-packet indicator.

The packets are organized in message buffers in the source node either before, or while, it transmits the segments of a message to the network link-switch.

Therefore, any node in the network may send and receive messages through its port, which in the preferred embodiment is connected by a bi-directional link to a receiver and a transmitter in a network link-switch. The switch receiver receives all messages transmitted by its connected source node, and the switch transmitter forwards all messages to its connected destination node.

This invention provides a special type of packet priority controls in the link-switch, which connect a switch receiver to the switch transmitter when the receiver is given transmission priority for transferring a received packet to that transmitter. In the detailed embodiment, if a switch transmitter is busy when a packet for the transmitter is received by a receiver, and then the packet is stored in the switch awaiting being given transfer priority for passing the packet to the designated transmitter. The switch may store all received packets for later transmission as long as the required transmitter remains busy.

The transmitters may be simultaneously transmitting segments of different messages to different destination nodes in parallel, and the receivers may be simultaneously receiving segments of different messages from different source nodes in parallel.

This invention improves the efficiency of port cache operation by maximizing the probability that each required message control block will be available in the node's port cache when its message packets are being received. This invention can significantly increase each port's cache operating efficiency by reducing castout trashing in the control cache which would occur if the burst characteristics of segment transmissions were lost.

A port cache requires a castout of a message control block (MCB) to its node's main memory when a packet of a message is received by the port, and the port cache is filled with other MCB entries and is therefore unable to control the received packet until a castout occurs allowing room in the cache for bringing in a new MCB for controlling the message of the received packet. The novel castout controls of this invention cause castouts to occur when they are least disruptive to communication signals received by a port, and when the castout MCB is most likely to not be need soon in the cache.

Figure 3:
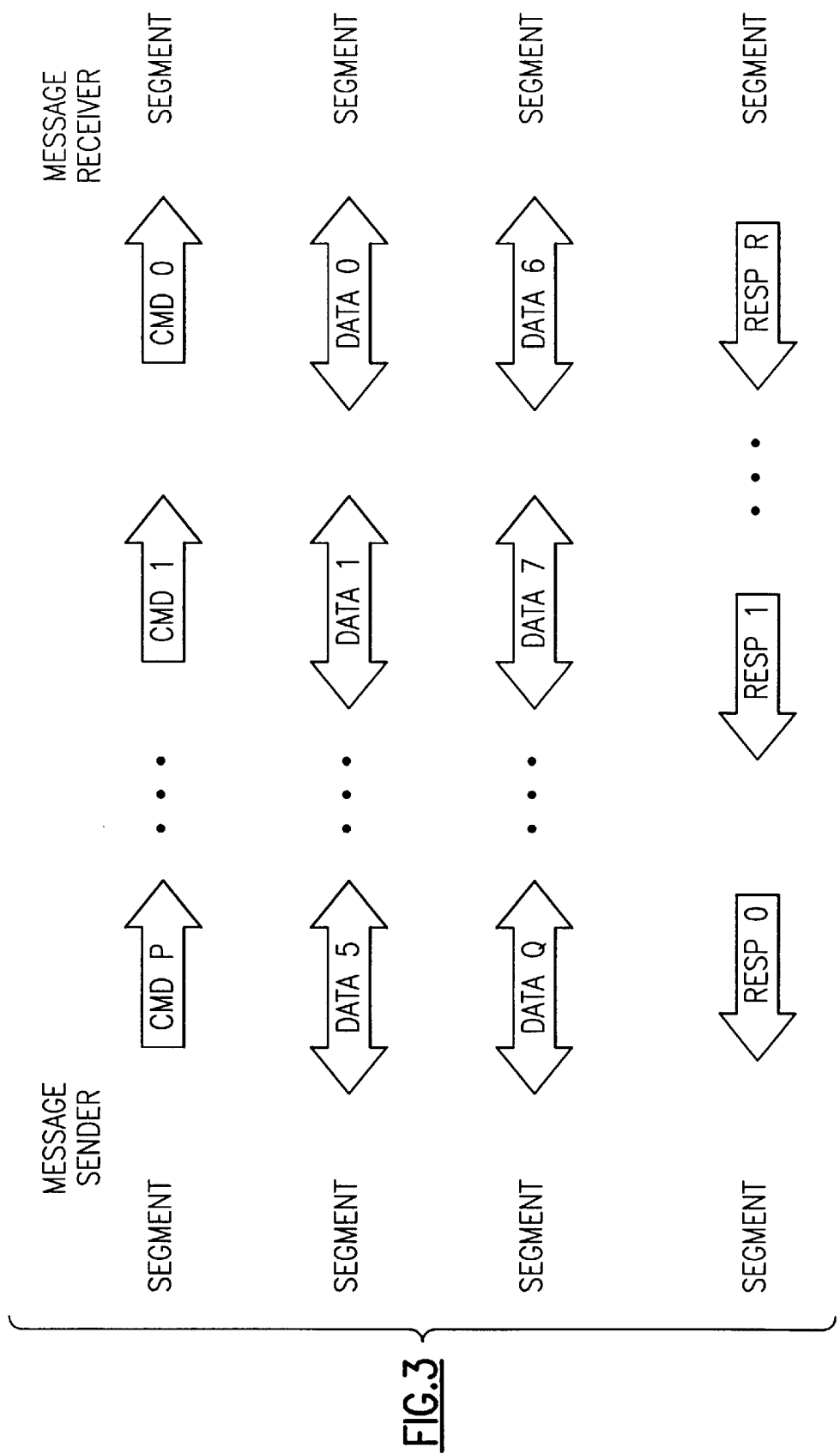
FIG. 3 represents an example of the packets in different segments of a message being communicated between any pair of nodes in a network.

FIG. 3 illustrates the transmission structure of the different segments in a message being transmitted by any source node to the network switch. Here, an exemplary message transmission is shown divided into three types of segments: a command segment, multiple data segments, and a response segment. All messages have at least the command segment and the response segment, but some messages do have any data segment.

Thus, each segment in FIG. 3 is shown as a sequence of one or more packets, in which each single headed arrow represents the transmission direction of the command and response packets (which are transmitted in the direction of the arrow between a commanding message sender and a commanded message receiver). Double headed arrows are shown on the data packets to represent that they may be transmitted in either of the two opposite directions on the link between the commanding and commanded nodes, according to whether the command segment requires a transmission of write data or read data. A write data segment is sent by the commanding node and may immediately follow the command segment. A read data segment is sent by the commanded node in response to its receipt of the command segment.

The response segment is sent from the commanded node back to the commanding node when all prior segments in the message have been transmitted. The response segment indicates the status of the commanded node at the end of the message processing. (This invention is not concerned with additional link hardware response protocols requiring a response signal after the communication of each packet, such as a response signal from the receiver back to the sender after the transmission of every packet to confirm a successful transmission, or a failed transmission of each packet requiring a repeat of the packet transmission.)

Thus in FIG. 3, the command segment contains command packets 0 through P. The data part of the message is shown with two segments, together containing packets 0 through Q. The first data segment has data packets 0 through 5, and the second data segment has data packets 6 through Q. The response segment is shown with response packets 0 through R. In the detailed embodiment, any segment may have up to 64,000 bytes in its packets, and each packet may be limited to 128 bytes. Using relatively short packets reduces the size of link buffers required at both the nodes and the switch ports.

In this invention, the packets are transmitted in strict order within each segment of a message, but segments of different concurrent messages may be interleaved in their transmission over the same link. All of the MCBs of a node can be located in the node's MCB Table, and they may be sorted according to their message identifiers, each message identifier being a concatenation of the source ID of the commanding node of each message, and a message ID (which is a unique number for each message provided by the commanding source node).

Thus in this invention, multiple messages can be currently active at any port, and their segment transmissions on the same link may be interleaved. However this invention prohibits the interleaving of packets when taken without regard to their segments as is done in the prior art. The novel segment interleaving of this invention has significant advantages over the prior art's single packet interleaving, because segment interleaving can result in faster communications and less castout thrashing than occurs with packet interleaving on a link.

Figure 4:
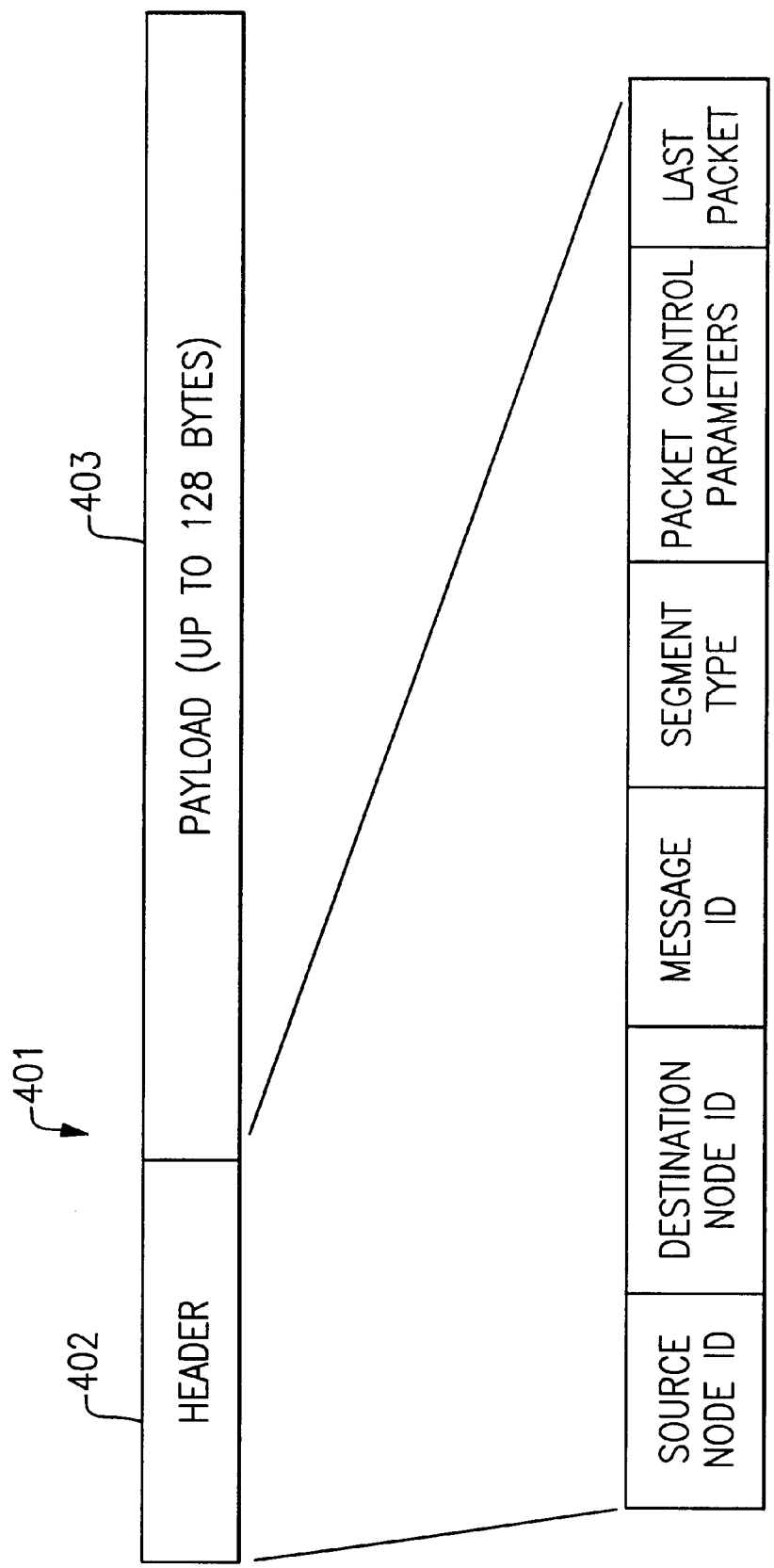
FIG. 4 represents the packet structure used in the detailed embodiment.

FIG. 4 shows a transmission structure for each packet in the detailed embodiment. Each packet 401 starts with a header 402 followed by a payload 403 which may contain command information, data information, or response information, depending on the part of the message containing the packet. Well known error checking fields (not shown) may also be included in the packet. Header 402 contains control information for routing the packet and status information. A header blowup in FIG. 4 shows the header contents to contain: a source ID, a destination ID, a message ID, the segment type (i.e. command, data or response), packet control parameters (such as message buffer information), and a last-packet indicator for indicating if the respective packet is or is not the last packet in its segment. In header 402, the destination and source node identifiers (IDs) identify the source and destination nodes for the packet transmission. The message ID provides a unique message number for each message sent by the same source node. The segment type distinguishes between the command, data, and response segments. The packet control parameters may contain credit counts used to regulate information flow through the network, and may contain an indication about message buffer ID used, or to be used, at the sender and the receiver of the message. The last packet field may be a single bit indicating whether this packet is the last packet of its segment or is not the last packet of its segment. (Instead of having the last packet field, alternatively a "packet count field" may be provided in the first packet of its segment for indicating the total number of packets in its segment). The payload 403 follows the packet header 402 and contains a variable number of message segment bytes, up to 128 in this embodiment.

Figure 5:
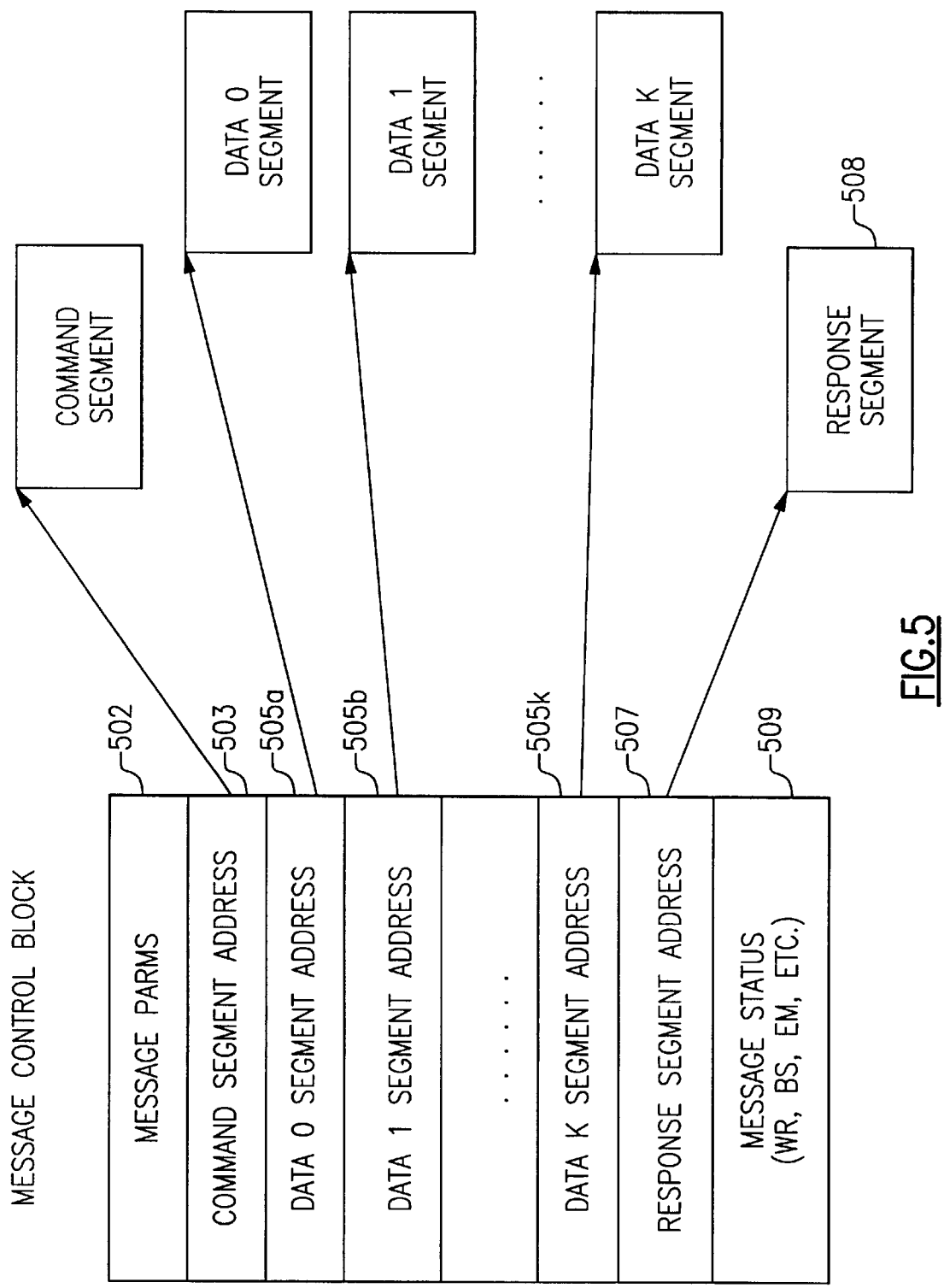
FIG. 5 represents a Message Control Block (MCB) structure for each message stored in an MCB Table in the main memory of each node in the network. This MCB structure is copied into any allocated empty MCB Entry in the associated port cache when a tag is assigned to the MCB in the cache. The tag is set to a non-empty state when the MCB Entry is copied into the cache.

FIG. 5 shows the structure of each message control block (MCB). All MCBs used for controlling all messages received and sent by the local node, may be located in the node's main memory in the MCB Table 601 shown in FIG. 6. Each MCB is used to control the transfer of packet data between a port buffer and assigned storage locations in the node's main memory for storing the payloads transmitted in the segments of each message. This MCB structure may contain a variable number of address fields, and in particular the number of data segment addresses 1 through K may vary in number since K is a variable. In general, these variable size MCBs are stored in fixed size blocks in the MCB Table 601 in the local node's main memory in FIG. 6, and may be stored in fixed size cache entries in the local port cache 902 in FIG. 9. Thus in the preferred embodiment shown in FIG. 5, each cache entry has a fixed size space for containing a variable size MCB, and each cache entry also has a space for containing a "sequence number" (Seq#) value associated with the MCB in the same entry.

Each MCB has a "message parameter" field 502 and a command segment address field 503 in the first two fields, and a "message status" field 509 as the last field in each MCB. The "data segment address" fields 505(a,b . . . k) have a maximum number, k, of field spaces, which are used sequentially from the first data 0 segment address 505a until the last "data segment addresses" K is stored for a respective MCB. Unused data spaces may exist following the used data field spaces when the MCB uses less than all of the data spaces. If more than data segment addresses exist in any MCB than are provided in the fixed size space, the last "data k segment address" space will contain an overflow indicator and the address of an MCB overflow area storing the remaining "data segment addresses".

The first field 502 contains message parameters which describe the length of the message segments, the number data segment addresses (505a, 505b, etc.) in this MCB entry, the read or write direction of any data segments, and other required fields. The response segment address 507 locates a memory area for storing the response segment information 508 of the message.

The last message status element 509 in each MCB in a cache entry includes status information describing the progress of the message transmission, of which the status controls for this embodiment include the following different types of segment wait control bits WR, BS, and EM, which are defined as follows:

WR—Set to ON state to indicate the message being processed at this node is "waiting for the first data segment or a response segment from the other node in the communication". The message command for the message has been sent or received by this node. WR is set to OFF state for each packet that does not set WR to the ON state.

BS—Set to ON state to indicate the message being processed at this node is "waiting between data segments". All of the data (read or write data) for the current segment has been received, and more data for the next data segment is expected. BS is set to OFF state for each packet that does not set BS to the ON state.

EM—Set to ON state to indicate the "end of message" state. All commands, data and responses of the message have been sent and received.

Note: The state of a message "waiting between packets within a segment" is implied for this node when both the WR and BS bits are in the OFF state before the end of message is reached. When the message is "waiting between segments and is not currently waiting for either data or a response", the WR bit is set to OFF state, and the BS bit is set to ON state.

Figure 12:
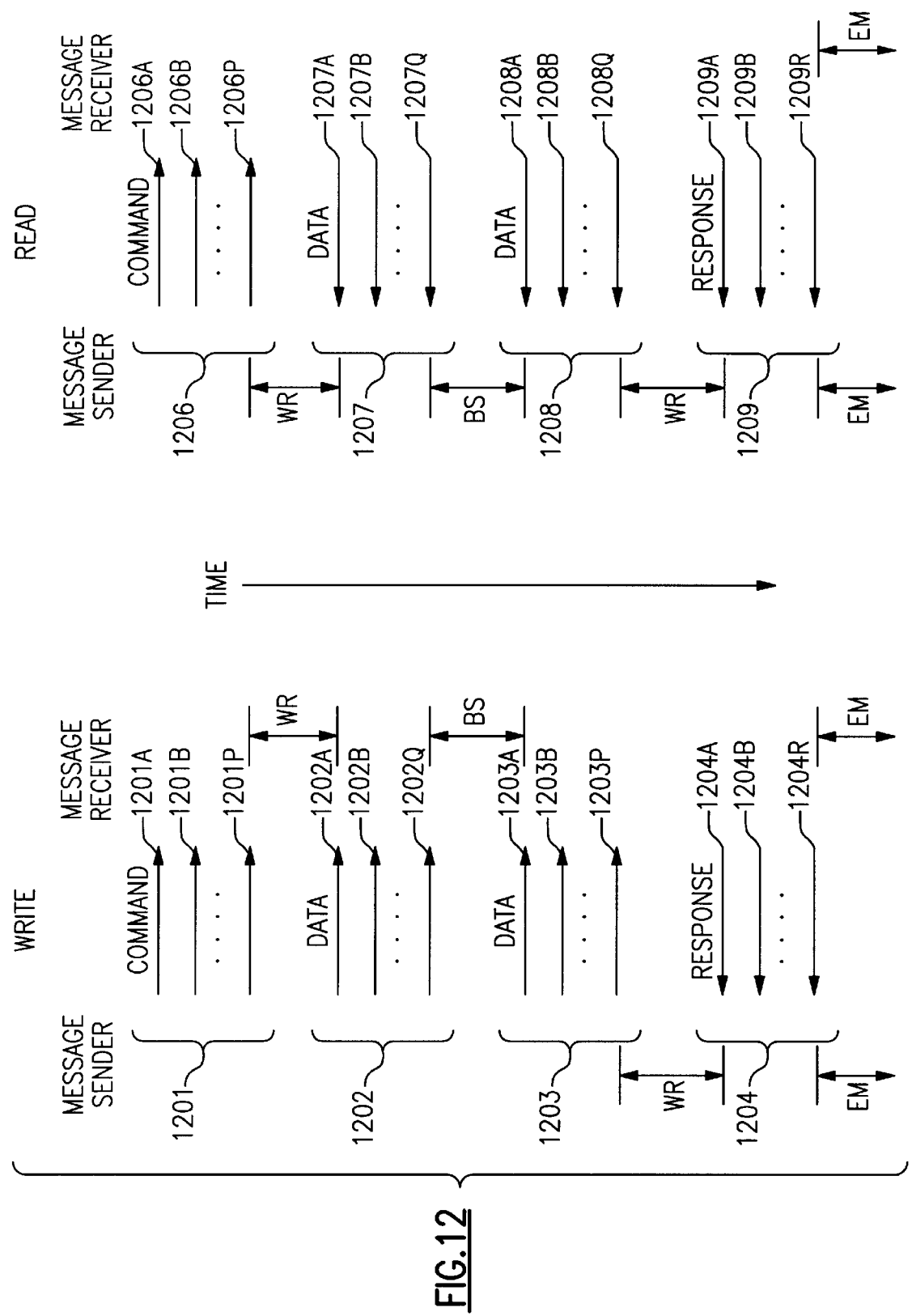
FIG. 12 represents a sequence of segments transmitting a message having a write data command, and a sequence of segments transmitting a message having a read data command.

FIG. 12 shows an example of when the control bits WR, BS and EM are set to their ON states. FIG. 12 shows a message having a write data command, and a message having a read data command. Each message has a plurality of segments in which each segment has a plurality of packets. Each packet represented in FIG. 12 is shown as a horizontal arrow, and the direction shown for the arrow indicates the direction of the transmission between message sender and message receiver (here the message sender is the commanding node and the message receiver is the commanded node). Thus, the write command segment 1201 is comprised of command packets 1201A–1201P; followed by data segment 1202 (comprised of data packets 1202A–1202Q) through data segment 1203 (comprised of data packets 1203A–1203Q), which is followed by response segment 1204 (comprised of response packets 1204A–1202R).

The vertical double arrowed lines indicate the length of time in which the WR bit, BS bit, and EM bit are in an ON state. During the other time in FIG. 12, these bits are in their OFF state. For example, the WR bit is set to ON state during the time between the write command segment 1201 and the first data segment 1202, and between the last data segment 1203 and the response segment 1204. The BS bit is only ON between the two illustrated data segments. If there are more than two data segments, the BS bit would be set to ON state between the transmission of each adjacent pair of data segments.

The same rules apply during the transmission of the read command message, which results in similar ON states. The read command segment 1206 is comprised of packets 1206A–1206P; followed by data segment 1207 (comprised of data packets 1207A–1207Q) through data segment 1208 (comprised of packets 1208A–1208Q), which is followed by response segment 1209 (comprised of response packets 1209A–1209R).

The MCB command segment area 504, data segment areas 506(a,b . . . k), and response segment area 508 may be scattered anywhere within the main memory.

Alternative embodiments (not shown) may organize each of the MCB entries in the port cache as a single pointer to a MCB structure of the type shown in FIG. 5, which may point to an associated MCB entry in the MCB Table 601, which would then contain the entire MCB (or a pointer to the required MCB). Instead, it is of course possible to have the cache entries contain only the message status fields 509 of the MCBs with a pointer to the entire associated MCB in the MCB Table 601, for example.

While any of these various MCB arrangements for the entries in the port cache may be used, the entire MCBs in the cache entries are used by the preferred embodiment shown in FIG. 5 because they enable the fastest access speed to the WR, BS and EM status fields when all MCB status fields must be quickly scanned to determine castout priority. Here, scanning speed is important in the operation of this invention, and adding addressing indirection slows the scanning operation in the cache's tag directory.

Figure 6:
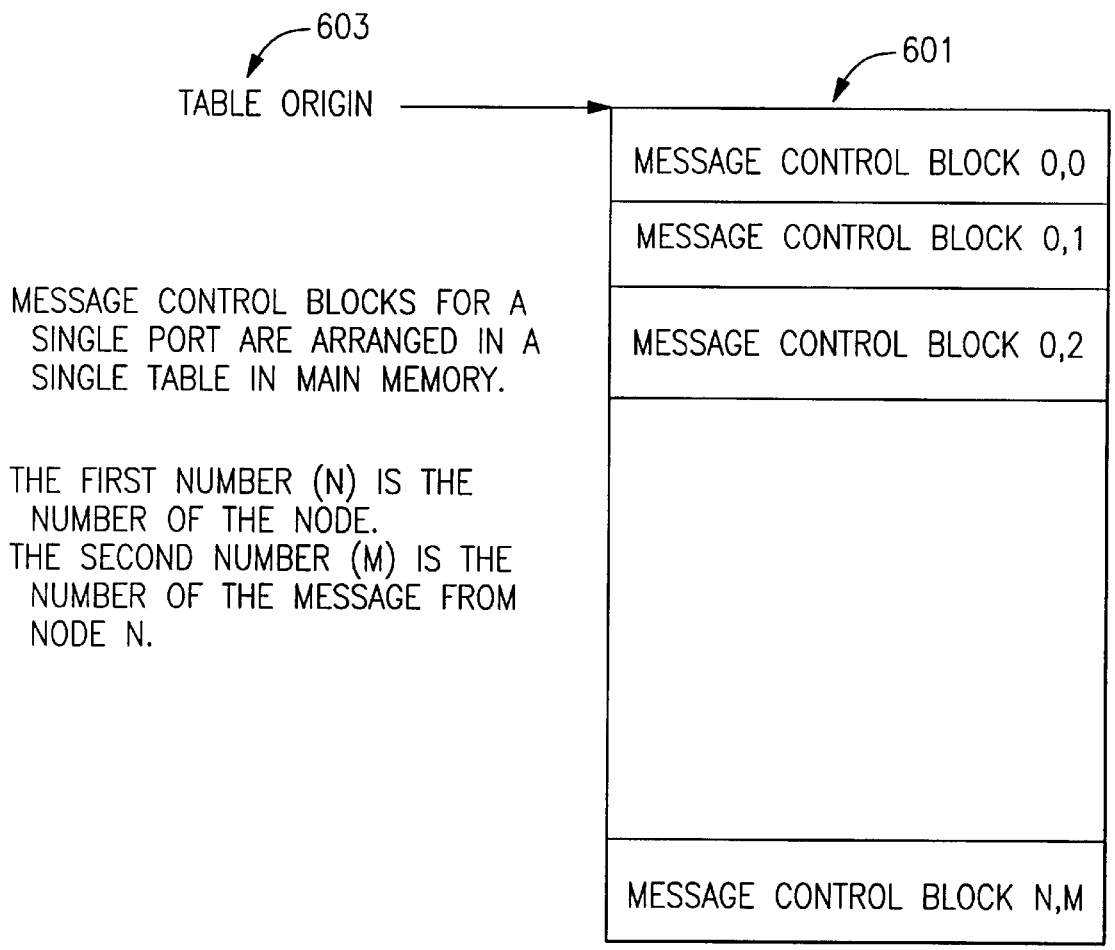
FIG. 6 represents a structure of the Message Control Block Table for locating the messages of each node in the main memory of the node. Each message control block representation in this control block has the structure shown in FIG. 5.

FIG. 6 shows the "Message Control Block Table" (MCB Table) 601 which provides a message control organization for efficiently managing archiving all MCBs of the respective node for all messages sent or received by the respective node's port. MCB Table 601 is stored in the node's main memory.

In the detailed embodiment, the sequence of MCBs in, or represented in, table 601 are sorted by source node identifiers and message identifiers indicating the number of messages provided from the associated node. Then, each MCB representation in table 601 can be found by a lookup based on the message's "source node ID, message ID" concatenated value from the MCB Table origin address 603 of table 601.

The determination of the location of any required MCB within the MCB Table starts with the table origin address 603 for calculating the location of the MCB of Table 601. The index in the table of each MCB may be easily determined when each source node is allocated the same amount of space in table 601, so that the message index may be calculated as: (required source ID minus 1)*(number of MCB representations in table 601 for each source ID)*(byte size of each MCB representation)+(required message ID for required source node)*(byte size of each MCB representation). In practice, source ID, message ID, and MCB representation size are preferably each a power of 2 allowing the index to be formed by simple concatenation.

Figure 7:
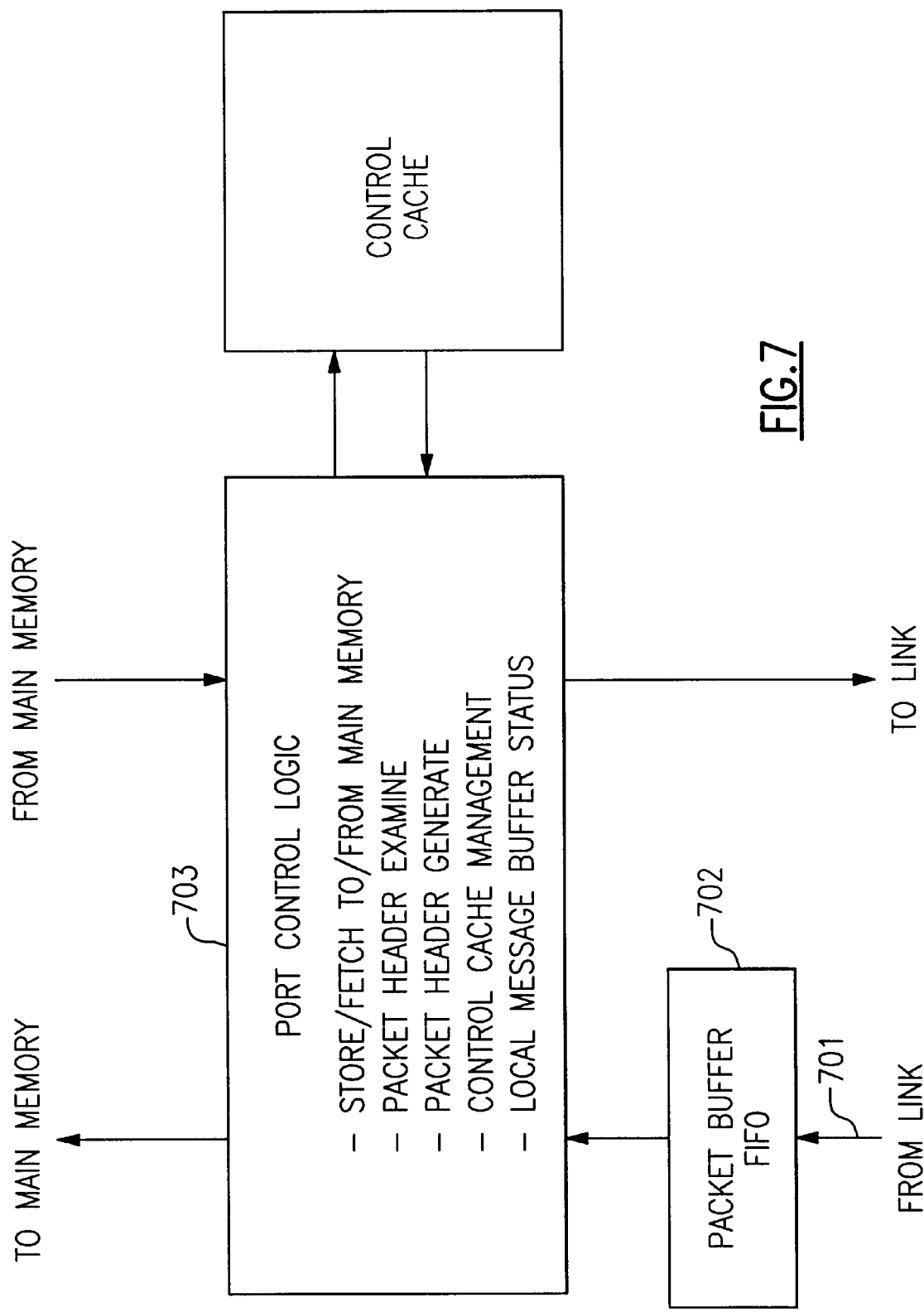
FIG. 7 generally represents the logic operational structure of the port provided for each node.

FIG. 7 summarizes the control logic of each node's port. It includes the following processes: 1. Store/fetch logic for controlling the copying in either direction of a packet between the node's main memory and the cache in the port, 2. A process for examining the packet header of each received packet, 3. A process for generating the packet header of each packet to be sent to another node, 4. A cache management control process for the local port's cache, and 5. A local message buffer status process which includes examining the status of the "active" bit for an associated message control block in a buffer in the port.

In the inbound direction, packets are received in packet buffers 702 from the link 701 in their segment order. The received packets are temporarily stored in a group of packet buffers 702 and taken out of the buffers in first in first out (FIFO) order. Control logic 703 reads the information in the packet headers from the packet buffers. A message being received in packet buffers needs to have its MCB validly in, or represented in, the port control cache, in order to be able to locate the nodal main memory location in which to store packet information and any packet payload, and to store the control logic updates of the message status in the local node. If the received message does not have its MCB, or its representation, in the port cache, it has to be located in the MCB Table and fetched therefrom into the port cache The outbound direction for packets sent to the link is also controlled by the control logic of FIG. 7, which operates when a program in the node wants to send a message. The sending program first builds the packets in the nodal main memory. This involves building a MCB for locating command, data areas, if any, and a response area in the main memory. To do this the program invokes a nodal operating system (or a communication program running thereunder) to select the port and to search for the appropriate message control block (MCB) in the MCB Table, using the source node ID which sent the message command having the message ID.

If no MCB is found in the MCB Table, a new MCB is allocated in the Table for this message at the appropriate location. An idle message buffer is found for the message, allocated to the message, and marked busy. The program then loads the parameters and addresses into the MCB. The control logic signals the node's port, fetches the MCB, or its representation, in MCB Table 601, and stores it in the an empty entry, if available, in the port's cache. If no empty entry is available, a non-empty cache entry is located, castout to the MCB Table, and then marked empty which makes it available to a new MCB. When this MCB is in the cache, it is used to locate and access the required main memory segment areas and to control the movement of the packet data between these memory areas and the port buffer. (For received messages, these segment areas are used to store the received payloads in main memory.)

For sent messages, these areas are used to copy to the port buffer the segments being generated for transmission. The control logic then generates the packet headers and copies the packets to the message buffer in the port for being sent to the link. Lastly, the program signals the port, indicating that a message is ready to be sent from the message buffers it just prepared. The signal includes the destination node ID, the message ID, and the MCB cache location for the message to be sent.

Figure 8:
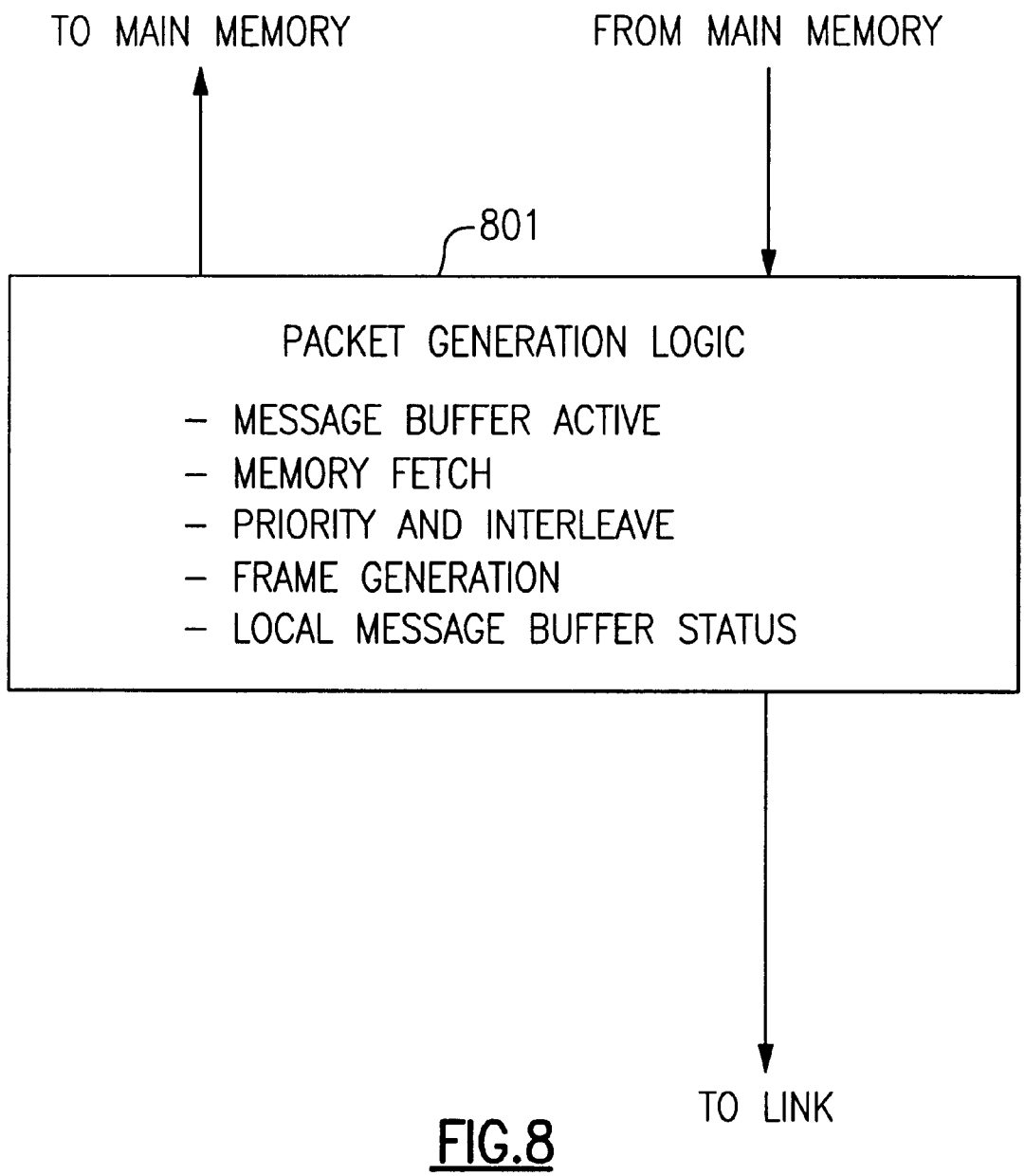
FIG. 8 illustrates the structure of each port's control logic for handling inbound packets.

FIG. 8 shows a summary of packet generation logic 801, in which the packet generating program marks the selected message buffer as active when the port receives the signal from the program. At this time, the same port may be generating outbound packets for other MCBs. The port logic sets up packets for a new request based on priority and interleave controls, which send packets for an entire segment of a message before it switches to sending packets for another segment of another active MCB.

To guarantee forward progress of all active MCBs, the priority and interleave controls only switch the packet transmission between different MCBs at message segment transmission boundaries, i.e. upon completion of transmission of the last segment. This segment interleaving may use any type of priority algorithm, including round robin, among different MCBs concurrently communicating messages at the port. The transmission of an entire segment as a burst without pause or interruption between the packets in the transmitting segment increases the efficiency of network communications.

When the outbound control logic receives a signal to start sending a message, the port sets an Active bit for the selected MCB entry in the MCB Table for the current message, fetches the appropriate message control block from the MCB Table, which is in the node's main memory. The MCB (or a pointer to the MCB) is copied into an empty entry in the port cache, if there is an empty MCB Entry in the local port cache, and the cache entry's tag field is set to indicate the non-empty state for its associated cache entry. If there is no empty MCB Entry in the cache, the message's MCB will be fetched and copied after a port cache entry is castout and set to empty state, which is described in the process in FIG. 10.

Using the command address in the MCB, the outbound control logic uses the associated MCB to obtain addresses, and send fetch requests to the nodal main memory for the required data. When the data is returned, the control logic generates each packet header and sends the packet with a payload of data on the outbound link. After all packets have been sent for the command segment, the outbound logic sets the MCB Active bit for the message being transmitted.

Figure 9:
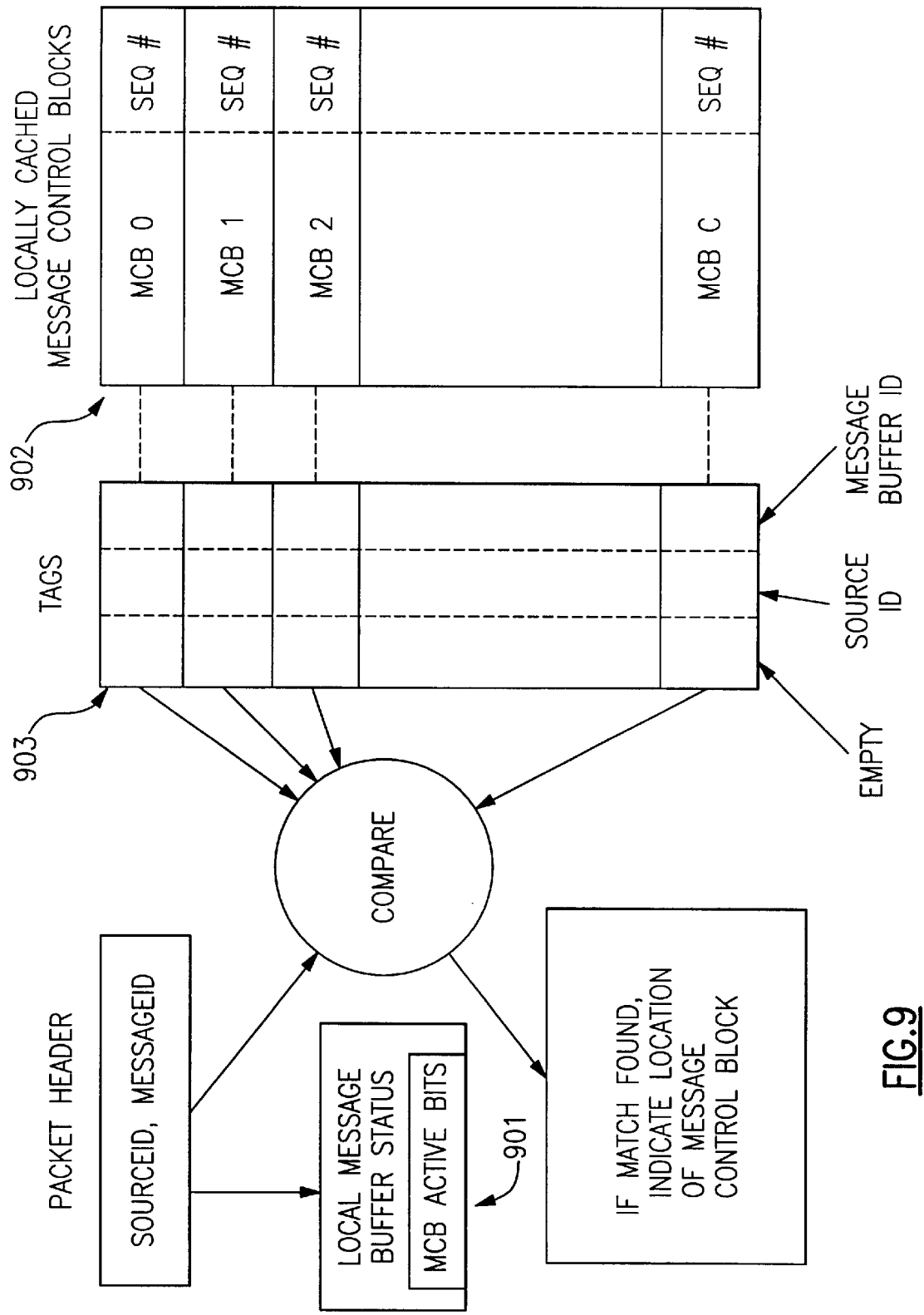
FIG. 9 illustrates the structure of each port's control logic for handling outbound packets.

FIG. 9 shows the port's cache hardware used by inbound messages using the control logic 703 in FIG. 7 for processing inbound packets. Local message buffer status contained in the port local storage includes a set of MCB Active Bits 901, which has M number of bit, one MCB Active bit for each MCB which can be contained in the MCB Table 601. The MCB Active bits are set on and off by the operation of the flow diagram shown in FIG. 10. The port cache 902 contains a number of MCB entries (0,1,2 . . . C) representing MCBs obtained from the nodal main memory, and C is much less than the maximum number of MCBs which may be contained in the MCB Table 601. The C+1 number of MCB entries in the port cache are obtained from the MCB Table. When not empty, each port cache entry contains a MCB (or a pointer to a MCB) and a sequence number (Seq.#) that is a time of day value entered into the cache entry when the MCB (or MCB representation) is put into that cache entry. Each sequence number is a unique value. The sequence numbers are used by this invention in its efficient control of "cast-out processing" in the process in FIG. 10.

A tag directory array 903 contains tag entries respectively associated with corresponding cache entries in the port cache 902. The tag entries are used for locating a required cache entry in the port cache 902. Each tag entry has fields for containing an empty bit, a source node ID and a message ID, which are associated with a corresponding cache entry in cache 902. When the empty bit is set to 1, it represents the non-empty state for its corresponding cache entry, and then the source node ID and a message ID fields will contain those values for the MCB contained (or represented) in the corresponding cache entry.

The message status field containing MCB Active bits 901 describes the processing status of the messages in the MCB Table, and each of the non-empty cache entries has an MCB copied from the MCB Table which has an associated MCB Active bit in the Local Message Buffer Status area of the port's local memory. For example, the status field indicates when its message buffer is actively receiving a message segment, which is a condition important in determining if castout is needed.

The source ID and message ID in each packet (received from the link into the local message buffer) are compared to the source ID and message ID in each of the cache tags for the directory 903 to find the required tag entry if it exists in the port cache. Alternatively, the source ID and message ID in each received packet may instead be indexed to the required tag entry which is compared to verify if it is the correct tag entry. Any tag entry comparing equal indicates a cache hit, and if no tag entry compares equal a cache miss is indicated requiring a fetch of the corresponding MCB in the MCB Table 601 at a location indicated by the required source ID and message ID in the received packet.

Figure 10:
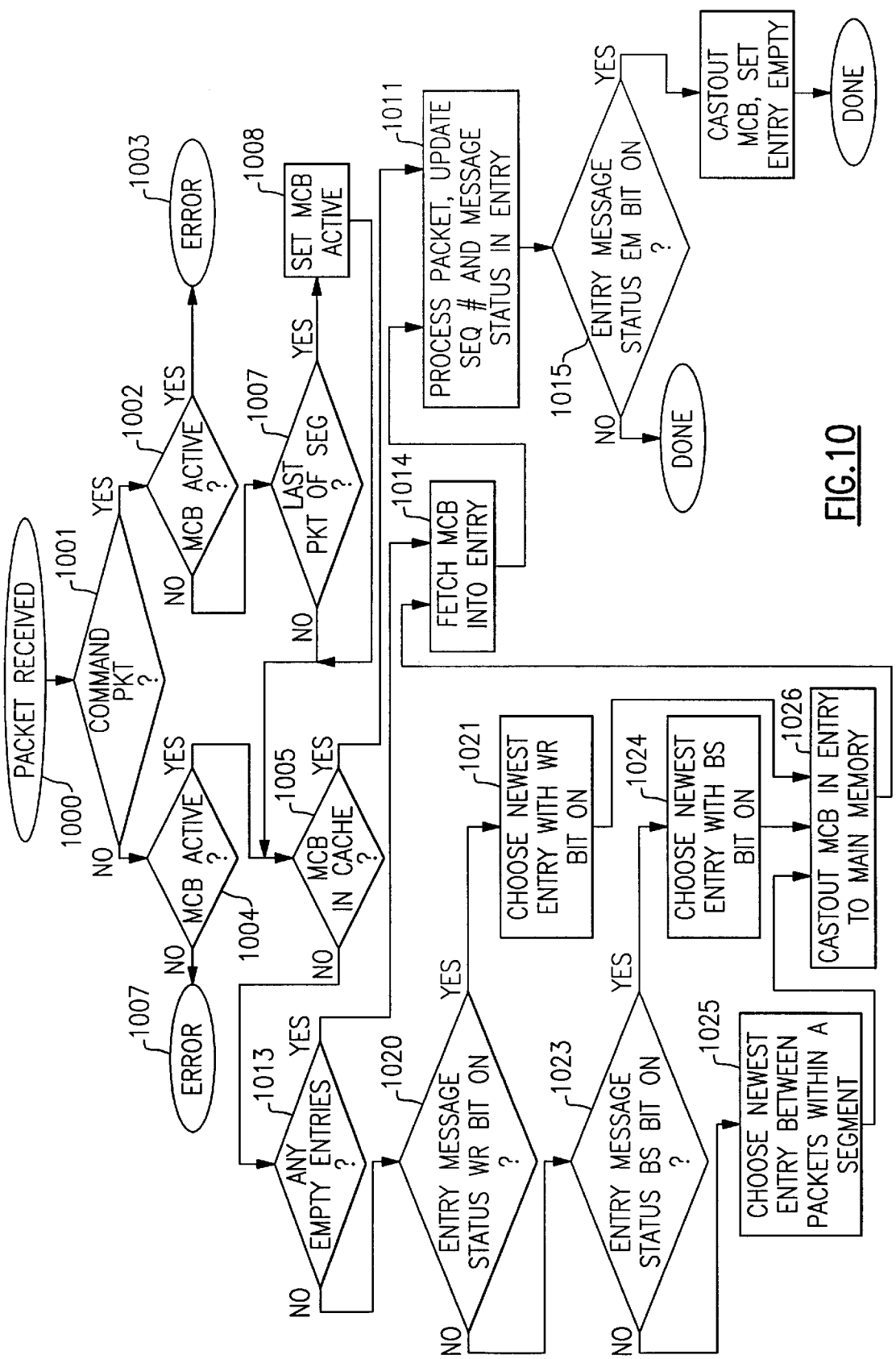
FIG. 10 illustrates a flow diagram of the port process for handling inbound packets in its communication cache and for determining when to castout an MCB Entry from the cache to an MCB Table in the associated nodes main memory.

FIG. 10 is a flowchart of the inbound packet processing (summarized in FIG. 7). After each packet is received and stored in a packet buffer 701, the port control logic performs operation 1001 which examines the packet header to determine if the received packet is a command packet (i.e. in the command part of the message). If it is a command packet, the yes exit is taken to operation 1002, which tests if the "MCB active" bit is set to its active state. This Active bit is located in a string of MCB Active bits located in the MCB status area shown in FIG. 7, and the sequence of Active bits in this string has the same order as the MCBs in the MCB Table 601. The Active bit is set to its inactive state when a message begins to be received and must be in its inactive state when each command packet is received, which causes it to take no exit from operation 1002 to operation 1007 which tests the state of the "last packet bit" in the header of the received packet. If operation 1002 finds the Active bit in the Active state for a command packet, an error condition exists and its yes exit is taken to error indication 1003.

When operation 1007 is entered (when the Active bit is off), and it finds the command packet is not the last packet in the command segment, its no exit is taken to operation 1005 which tests to determine if the required MCB (identified by the source ID and message ID in the received packet). If operation 1007 finds the command packet is the last packet in the command segment, its yes exit is taken to operation 1008 which sets the MCB Active bit for the required MCB, and then operation 1005 is entered.

Operation 1000 also obtains from the header of the received packet its source node ID and the message ID. Then, the source node ID and the message ID can be used as an index into the local tag array 903 to determine if the cache has an entry for the corresponding MCB.

If operation 1001 finds (from the header in the received packet) that it is not a command packet (such as when it is a data packet or a response packet which must be received after the command segment of the message), the no exit is taken to operation 1004 which tests the state of the Active bit for the MCB identified by the source ID and message ID found in the header in the received packet. Test 1004 should find the Active bit in its active state, because operation 1008 is required to have previously set it to the active state at the end of the first segment in the message (its command segment), and then test 1004 takes its yes exit to operation 1005. If operation 1004 finds the Active bit in its "MCB Active" state, an error condition exists and the no exit is taken to error indication 1007.

When operation 1005 is entered in FIG. 10, operation 1005 checks to determine if the required MCB entry is in the cache. To do this, operation 1005 obtains the packet's source ID and message ID and compares them to the contents of the tag array entries to determine if the required MCB is currently represented in the cache 902. If operation 1005 determines the MCB is in a port cache entry (an MCB is considered in a cache entry if the entry contains a pointer to the MCB in the MCB Table), this cached MCB is used to process the received packet by entering operation 1011, which for example includes checking the segment type in the header of the received packet, and storing the payload of the packet in main memory at an associated segment address in the message control block. After the packet payload is successfully stored, the message control block status field is updated in the MCB in the cache to identify the particular packet being currently processed so that the status represents exactly where in the message the message processing is currently at.

When operation 1011 is completed, the next operation 1015 checks if the current packet is the last packet of the message. If it is not the last packet in the message, the no exit is take from operation 1015 and the processing for the current packet is done. Then, the inbound port controls await a next received packet, and when it is received operation 1001 is entered to again start the process in FIG. 10 from its beginning for each next packet received.

However, if operation 1015 finds the end of the message is indicated in the header of the current packet, operation 1016 is entered, which stores the MCB of the cache entry into the MCB Table at its determined location (unless the MCB in the Table is the MCB being processed from a pointer in the port cache entry, in which case the MCB is already updated). Operation 1016 also sets the tag for this port cache entry to its empty state, so that this cache entry is indicated as empty to make it available for representing a new MCB in the cache, and the port processing for the received message is done.

However, a cache castout procedure is performed if operation 1005 determines the MCB for the received packet is not represented in the port cache. Then the "no" exit of operation 1005 is taken to operation 1013 which determines if the cache has at least one empty MCB Entry (having a tag currently set to empty state). If operation 1013 finds an empty MCB Entry, the yes exit is taken to operation 1014 which fetches the MCB from the MCB Table in main memory after calculating the address of the required MCB using the table origin address, and the source ID and message ID of the current packet. After operation 1014 copies the MCB into the MCB Entry assigned to the MCB in the cache, operation 1011 uses the port control logic in the manner previously explained for operation 1011 and its following operations which are performed until the processing of the packet is done. A next packet for the message will follow, and the process in FIG. 10 again starts from its beginning when the next packet is received.

If operation 1005 finds the message control block for the received packet is not in the port cached, and operation 1013 finds there is no empty MCB Entry in the cache, the no exit is taken to operation 1020 to determine which of the non-empty cache entries is to be forced to an empty state to make room in the cache for the needed MSB Entry.

To find the 'best' candidate to be castout to the MCB Table, operation 1020 has the port control logic go through a procedure which examines the message status in up to all cached MCBs having non-empty cache entries which are waiting for data packet or a response packet. The operation 1020 procedure is looking for an MCBs that is likely to have the longest wait for its data or response, wherein its MCB is likely not to be needed for the longest time of all of the MCBs in the cache. To do this, operation 1020 examines MCBs having in any order, which may be in sequence from the first cache tag in an attempt to find a current non-empty cache tag representing. an MCB which is a first priority castout candidate.

A first priority candidate is any MCB that has ended a major part of its message and is waiting to start its next major part of the message, such as having finished the command part and is waiting to start a read data part or a response part which generally take a relatively long time since they require a performance by another node in the network. Generally, a performance required in the same node will take a much smaller wait time. If operation 1020 finds several first priority candidates, its yes exit is taken to operation 1021 which selects the newest MCB in the cache meeting the first priority castout criteria. The newest MCB is preferred for castout because, on average, it has the longest time to wait for its response of all the MCBs meeting the first priority criteria if we assume that the wait time for response from another node takes approximately the same amount of time for all first priority candidate MCBs.

Operation 1021 determines the newest MCB by examining the sequence numbers with the MCB entries found to have the first priority. In FIG. 9, see the SEQ# with each MCB cache entry. The sequence number is a time-of-day (TOD) value entered into a cache entry when the MCB is stored into the cache entry. Each of the first priority cache entries found has a different time of day which indicates how recent the MCB was put into the cache. Operation 1021 selects the first priority entry having the sequence number indicating the most recent TOD value, which is generally the highest value unless the midnight boundary has just crossed into the next day. In this manner, operation 1021 selects the newest waiting first priority MCB for castout, which is thereby expected to be the MCB which will not be needed in the cache for the longest time among all of the MCB entries in the cache.

(Note that this invention's castout of the newest cache entry is novel, since prior-art caches "castout" the LRU or oldest cache entry.)

However, if operation 1020 does not find any first priority MCB entries in the port cache, its no exit is taken to operation 1023 to determine if any "second priority" MCBs exist in the port cache, which is a search for any MCBs waiting between segments. That is, the second priority MCBs are those MCBs for messages which have completed a segment received by the port, and are waiting for the port to receive the start of its next segment. A longer wait is expected between the segments in the same part of a message than the wait between packets within the same segment. If more than one MCB is found having the second priority, the yes exit is taken to operation 1024 which chooses the "newest" of the second priority MCBs for castout by examining the sequence numbers with the second priority MCBs, because the newest has the longest wait for the next data segment, assuming that the time between different data segments is substantially the same. Then operation 1026 is entered to castout the chosen second priority MCB entry.

However, if operation 1023 does not find any second priority candidate, operation 1025 is entered because no active message having a MCB in the cache was found waiting between segments. When operation 1025 is entered, it chooses the among the active messages having MCBs waiting between packets within a segment, and they are "third priority" candidates for castout. If operation 1025 finds multiple third priority candidates, it uses the sequence numbers in these cache entries to choose the "newest" cache entry as the MCB having the most recent TOD in its sequence number, and is expected to have the longest waiting time before it will next be needed in the cache. When operation 1025 is performed, operation 1026 is entered and the chosen cache entry is castout from the cache by storing it into the MCB Table and setting the entry to the empty state. Operation 1014 is entered from operation 1026, and operation 1014 and its following operations are performed in the manner previously explained herein.

(Again, note that the prior art cache castout controls select the oldest, or least recently used, LRU, cache entry for castout, which is very different from what is done in this invention.)

It is to be recognized that a different "newest" standard is used by each of operations 1021, 1024 and 1025, because each of these operations selects its "newest MCB" from a different type of priority defined for different sets of MCBs in the port cache. That is, operation 1021 selects its newest MCB only from the MCBs waiting for data or waiting for a response from another node. Operation 1024 selects its newest MCB only from the MCBs waiting between data segments, and operation 1025 selects its newest MCB from all MCBs waiting between data packets within the same segment.

Figure 11:
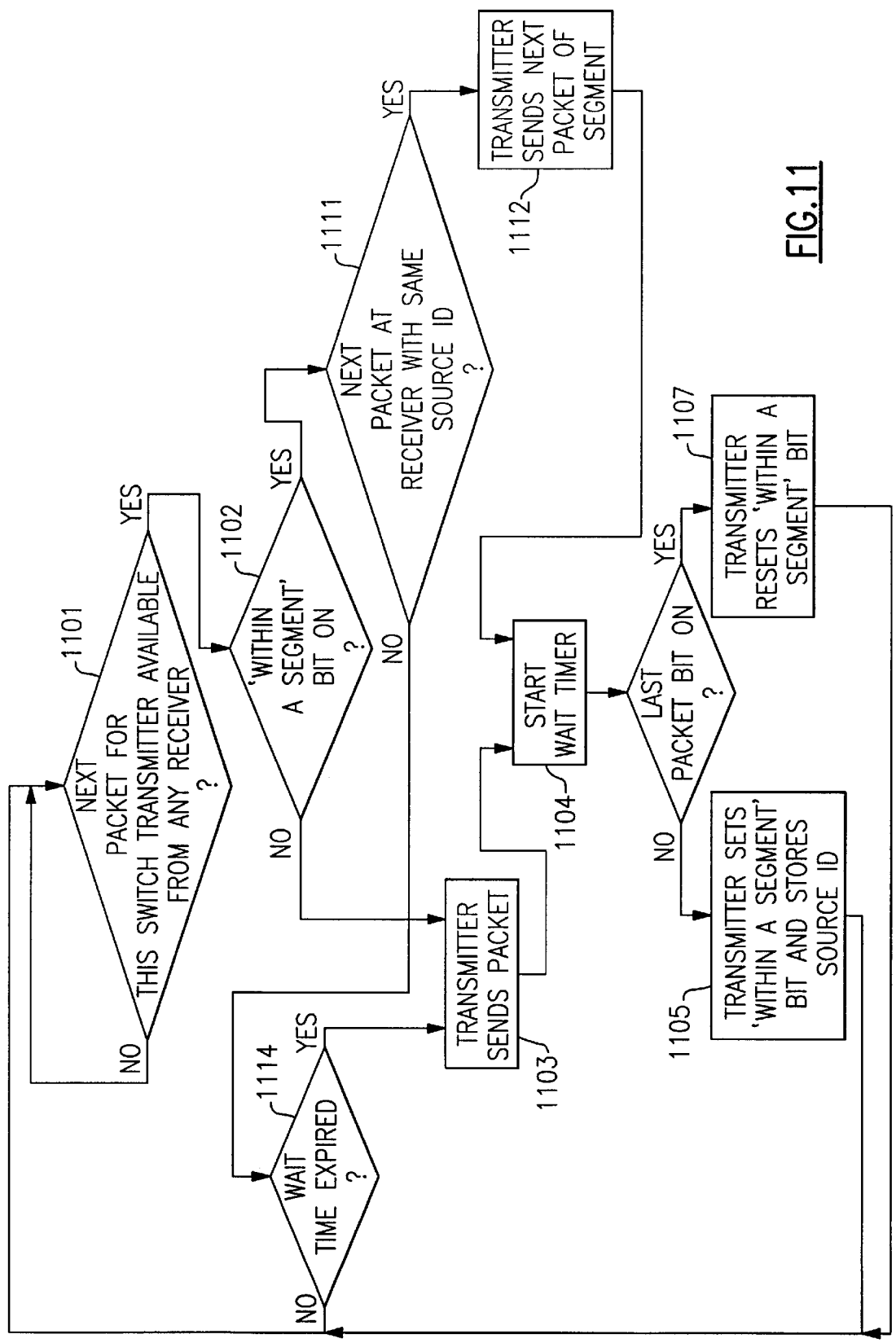
FIG. 11 illustrates a flow diagram used within a network link switch for representing the internal switch controls that transmit to destination nodes the segments of messages received from source nodes in a network.

FIG. 11 shows a process internally used in the network switch of the described embodiment for forwarding packets grouped in segments between the nodes of the network. The process in FIG. 11 is being executed in parallel by each of the transmitters in the network switch. Thus, a plurality of transmitters in the network switch may be transmitting different segments in different messages to plural destination nodes at the same time. The receivers in the network switch may concurrently be receiving packets in different messages in parallel from different source nodes, of which each received packet is a packet in a segment currently being transmitted by a node in the network.

The hardware of the network switch has a respective receiver and transmitter connected to the bi-directional link to/from each of the nodes in the network. Each switch receiver is assigned the source ID of the node to which it is connected. Each switch transmitter is assigned the destination ID of the node to which it is connected. Each transmitter has an associated bit, called a "within a segment" bit with an associated "source ID" field. A transmitter's "within a segment" bit is set on when the transmitter sends a packet that is not the last packet in its segment, and then the transmitter's "source ID" field is set to the source ID of the last packet outputted by the transmitter to its destination node, if that packet is not the last packet of a segment. If the transmitted packet is the last packet of a segment, the "within a segment" bit is set off. When the "within a segment" bit is set off, the content of the associated source ID field is invalid, and when the "within a segment" bit is set on, the content of the associated source ID field is valid.

The last packet of a segment may be determined by the switch in several different ways: One way is to have each packet's header indicate whether the packet is the last packet of a segment or not, and this way is used in the preferred embodiment. Another way is to have a segment count in the first packet of each segment to indicate the number of packets in the segment.

Each transmitter identifies a new segment when it transmits a packet while its "within a segment" bit is off. Then the transmitter sets on the "within a segment" bit and writes the source ID in the packet into the transmitter's "source ID" field. Thereafter, the transmitter gives priority to transmitting packets having the same source ID indicating the packet is in the same segment, even though another receiver with a different source ID may have received an earlier packet for the same transmitter. Thus, each transmitter gives priority to the next packet in the same segment it is currently transmitting, and holds off transmitting packets received for other segments it will be transmitting.

When any transmitter ends its transmission of a segment, the transmitter becomes available to handle the transmission of another segment to the same destination node, which may be a segment from a different source node in a different message. In this manner, segments of different messages may be interleaved to the destination node. The interleaving occurs primarily during significant delay periods between segments to increase the efficiency of communications over the links of the network.

In more detail, the process in FIG. 11 occurs for each of the transmitters in the switch. The initial operation 1101 in each transmitter's process matches the transmitter's destination ID with the destination ID in each received packet. If any received packet is found to have a match with the transmitter's destination ID, then operation 1102 is performed to check the state of the "within a segment" bit in the header of the received packet. In all packets except the last of a segment, the "within a segment" bit is in its off state, and then operation 1103 is performed which causes the transmitter to transmit the packet to its connected destination node. Next operation 1104 starts a wait time-out period beginning at the transmission of the packet. When operation 1105 is entered, it sets the "within a segment" bit to its on state, and stores in the transmitter's source ID field the source ID in the transmitted packet (which indicates the switch receiver is providing the current segment to the transmitter). The process then loops back to operation 1101, wherein the transmitter looks at all receivers to detect when any receiver has a packet with a destination ID matching the connected node of the transmitter, and then the transmitter gives transmission priority to any received packet having its contained source ID matching the source ID stored for the transmitter.

The no exit from operation 1101 is taken when no packet is received by any receiver, and the yes exit is taken to operation 1102 when a packet is received by any receiver. More than one receiver may concurrently have received packets with the destination ID of the transmitter. Operation 1102 tests the state of the transmitter's "within a segment" bit, and if in the on state, the transmitter's source ID field is useable, and the yes exit is taken to operation 1111. If in the off state, the no exit is taken to operation 1103.

When the yes exit is taken, operation 1111 matches the transmitter's source ID field with the source ID of any received packet(s) at one or more of the receivers. If any received packet matches the transmitter's source ID field, the yes exit is taken from operation 1111 to operation 1112. If no received packet matches the transmitter's source ID field, the no exit is taken from operation 1111 to operation 1114. If operation 1112 is entered, the matching received packet is sent by the transmitter to the destination node, and operation 1104 is entered to start the wait timer for a time-out period. Then operation 1105 tests if the currently sent packet is the last packet in the current segment. If it is not the last segment, the no exit is taken to operation 1106 which sets the "within a segment" bit to its on state and stores the source ID into the transmitter's source ID field. This path in the process gives priority to a received packet that has the matching source ID. Then operation 1101 is re-entered.

However, if operation 1105 finds the transmitted packet is the last segment, the yes exit is taken to operation 1107 which resets the "within a segment" bit to the off state. Then operation 1101 is re-entered.

But if the no exit is taken from operation 1111 (indicating no packet has been received for the current segment, which has not yet received its last packet), then operation 1114 is entered to determine if the wait time-out period has expired for the current segment (the time-out was started by the transmission of the segment's last transmitted packet). If the time-out period has not expired, operation 1101 is re-entered looking for the next packet as the wait continues. However, if operation 1114 finds the wait time period has expired, then its yes exit is taken to operation 1103 in which the transmitter sends the received packet having a non-matching source ID, which is in a different segment because it has a different source ID.

Thus, the last transmitted packet by operation 1103 interrupted the transmission of a segment, and initiated the transmission of a different segment. The interrupted segment has not yet received its last packet, and therefore needs to be resumed at a future time whenever the next packet in the interrupted segment is received by the switch and its required transmitter is available.

After the packet is transmitted by operation 1103, then operation 1104 is entered and continues: either on the previously explained path 1104, 1105, 1106 or on the previously explained path 1104, 1105, 1107.

When a segment is interrupted, it later is continued by the switch when its source node continues the transmission of its packet(s). Such packet transmission may be continued either when the "within a segment" bit is found in the off state via path 1102 and 1103, or when the "within a segment" bit is found in the is on state, and operation 1111 is entered and finds no packet has been received for the then current segment, and its following operation 1114 determines a time-out has occurred for the then current segment, allowing that segment to be interrupted and the previously interrupted segment to be resumed.

At any instant, all transmitters in the network switch may, in their separate executions of the process in FIG. 11, be sending packets for different segments in different messages to their different destination nodes.

While I have described the preferred embodiment of my invention, it will be understood that those skilled in the art, both now and in the future, may make various improvements and enhancements which fall within the scope of the claims, which follow. These claims should be construed to maintain the proper protection for the invention first disclosed here

Having thus described my invention, what I claim as new and desire to secure by Letters Patent is:

1. A communication method for use in ports of a multi-node network in which nodes are connected by links, comprising:

receiving a message packet of a message sent by a source node on one or more links in the network to a buffer in a port of a destination node, wherein the message packet comprises a unique identifier of the source node and the message being received;

comparing the unique identifier with tags in a cache directory of a communication cache in the port of the destination node in the network to determine if a message control block (MCB) for the message packet is available in the cache, each tag containing space for identifying a message and for indicating if an associated cache entry is empty, each associated cache entry containing space for a sequence indicator and space for storing an MCB or a pointer to an MCB or a part of an MCB;

if the MCB is found available by the comparing operation, processing the received message packet by storing information of the packet into a memory of the node at a location determined from the content of the MCB;

updating a message status area of the MCB; and casting out the MCB to an MCB Table in memory when the updating operation indicates the message has completed.

2. A communication method for use in ports of a multi-node network in which the nodes are connected by links as defined in claim 1, further comprising:

testing an MCB Active field associated with the message identifier for the received message packet to determine if the MCB Active field indicates the MCB for the message of the received message packet currently has an active status; and determining if the MCB is available in any non-empty cache entry by using the unique identifier in the received packets before comparing the unique identifier with the tags in the cache directory.

3. A communication method for use in ports of a multi-node network in which the nodes are connected by links as defined in claim 1, further comprising:

testing a received packet to determine if the packet is a command packet;

if the testing operation finds the packet is a command packet, examining an MCB Active field associated with the message identifier for the received packet to determine if the MCB Active field indicates the MCB for the message of the received packet currently has an active status;

if an inactive status for the MCB is found by the testing operation, determining if the received packet is the last packet of the command segment of the message; and if the packet is determined to be the last packet of the command segment of the message, setting the MCB Active field to indicate MCB Active state.

4. A communication method for use in ports of a multi-node network in which the nodes are connected by links as defined in claim 3, further comprising:

if the testing operation for examining the MCB Active field finds an active status for the MCB, an error condition is indicated for the packet.

5. A communication method for use in ports of a multi-node network in which the nodes are connected by links as defined in claim 2, further comprising:

if the MCB is determined to not be available in the cache locating an empty cache entry for storing a copy of the MCB fetched from the memory; and if an empty cache entry is found, fetching into the empty cache entry a copy of the MCB in a MCB Table at a location determined by the unique identifier of the message, and continuing to process received packets of the message using the MCB fetched into the cache.

6. A communication method for use in ports of a multi-node network in which the nodes are connected by links as defined in claim 2, further comprising:

checking a message status indicator setting in the MCB of a non-empty cache entries in the cache to determine a cache entry which is a candidate cache entry for castout from the cache when no empty cache entry is found in the cache;

accessing one or more of the non-empty cache entries to read one or more contained waiting between segments indicators;

selecting an accessed cache entry of one or more entries found to contain a first type of waiting between segments indicator of which the selected cache entry contains a newest sequence indicator of all entries currently having a first type of waiting between segments indicator, the first type waiting between segments indicator indicating a cache entry starting to wait for any one of a first data segment, or a response segment, from another node in the network;

casting out to the MCB Table the MCB in the selected cache entry determined by the selecting operation; and fetching into the selected cache entry a copy of the MCB in a MCB Table at a location determined by the unique identifier of the message of the received packet;

continuing to process packets for the message using the MCB fetched into the cache, and updating status for the MCB including the waiting between segments indicators therein as the received packets of the message are processed.

7. A communication method for use in ports of a multi-node network in which the nodes are connected by links, as defined in claim 6, further comprising:

when no cache entry is found to have the first type of waiting between segments indicator, selecting an accessed cache entry of one or more entries found to contain a second type of waiting between segments indicator, of which the selected cache entry has the newest sequence indicator of all current entries having the second type waiting between segments indicator, the second type waiting between segments indicator indicating a cache entry starting to wait for a next data segment.

8. A communication method for use in ports of a multi-node network in which the nodes are connected by links, as defined in claim 7, further comprising:

when no cache entry is found to have the first or second type of waiting between segments indicator, selecting an accessed cache entry of one or more entries found to contain a third type of waiting between segments indicator, of which the selected cache entry has the newest sequence indicator of all current entries having the third type waiting between segments indicator, the third type waiting between segments indicator indicating a cache entry starting to wait for a next packet within a segment.

9. A communication method for use in ports of a multi-node network in which the nodes are connected by links, as defined in claim 8, further comprising:

using a number generator for generating an increasing sequence of numbers, in which a currently generated number is written into a sequence number field in a cache entry when the status field in a MCB in the cache entry is being updated for a received packet to indicate the newest of the cache entry among the non-empty cache entries in the cache.

10. A communication method for use in ports of a multi-node network in which the nodes are connected by links, as defined in claim 9, further comprising:

using a time of day clock as the number generator to generate the sequence indicators written into the cache entries for indicating when each cache entry starts a wait period for determining the newness among a plurality of cache entries containing the same type of waiting between segments indicator.

11. A method of communicating messages from a message sender node to a message receiver node in a multi-node network, comprising:

segmenting a sequence of packets in a message transmitted by a source node by indicating a last packet transmitted for a segment to indicate a significant delay is expected between segments in the message;

receiving a packet of a segment at a receiver in a link switch;

storing a respective source node address for a transmitter in the switch for indicating the source node address of a first packet of a current segment being transmitted by the transmitter;

comparing the source node address currently stored in the transmitter to the source node address in a packet currently received by each receiver of the switch; and selecting as a next packet for transmission by the transmitter a currently received packet having a source node address comparing equal with the source node address stored for the transmitter and containing a destination address equal to the destination address of the node connected to the transmitter;

receiving in a port of a destination packet of a message sent by a source node on one or more links in the network to a buffer, and receiving command packets at the port for a message containing a unique identifier of the source node and the transmitted message;

comparing the unique identifier with a tag in a cache directory of a communication cache in the port of the destination node in the network to determine if a message control block (MCB) for the message is available in the cache, the tag containing space for identifying a message and for indicating if an associated cache entry is empty or not, the associated cache entry containing space for a sequence indicator and space for storing an MCB or a pointer to an MCB or a part of an MCB;

if the MCB is found available by the comparing operation, processing the received packet by storing information of the packet into a memory of the node at a location determined from the content of the MCB;

updating a message status area of the MCB; and casting out the MCB to an MCB Table in the memory when the updating operation indicates the message has completed.

12. A communication method for use in a port of a multi-node network in which the nodes are connected by links, as defined in claim 11, further comprising:

ending the forwarding of a segment by the switch if an waiting between segments timeout expires as measured from the last packet transmitted to the same destination node when excessive delay is encountered during a burst of transmitted packets.

13. A communication method for use in ports of a multi-node network in which the nodes are connected by links as defined in claim 1, wherein the updating the message status area step comprises indicating the message is waiting for any one of waiting for a first data segment, waiting for a response segment, waiting between data segments, or the message is ended by having been completely received.

14. A communication method for use in a port of a multi-node network in which the nodes are connected by links, as defined in claim 11, wherein the updating the message status area step comprises indicating the message is waiting for any one of waiting for a first data segment, waiting for a response segment, waiting between data segments, or the message is ended by having been completely received.

* * * * *